(12) United States Patent
Hu

(10) Patent No.: US 8,374,140 B2
(45) Date of Patent: Feb. 12, 2013

(54) FRAME BASED, ON-DEMAND SPECTRUM CONTENTION DATA FRAME ACQUISITION

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 217 days.

(21) Appl. No.: 12/721,400

(22) Filed: Mar. 10, 2010

(65) Prior Publication Data

US 2010/0232359 A1    Sep. 16, 2010

Related U.S. Application Data

(60) Provisional application No. 61/158,855, filed on Mar. 10, 2009.

(51) Int. Cl.
*H04W 4/00* (2009.01)
*H04B 7/26* (2006.01)
*H04L 12/413* (2006.01)
*H04J 3/06* (2006.01)

(52) U.S. Cl. ........ 370/329; 370/338; 370/350; 370/447; 370/461; 370/462; 455/509; 455/524

(58) Field of Classification Search ............ 370/329, 370/338, 350, 447, 461, 462; 455/450, 509, 455/524
See application file for complete search history.

(56) References Cited

U.S. PATENT DOCUMENTS

| | | | |
|---|---|---|---|
| 5,384,777 A | 1/1995 | Ahmadi et al. |
| 5,781,536 A | 7/1998 | Ahmadi et al. |
| 5,870,385 A | 2/1999 | Ahmadi et al. |
| 6,597,671 B1 | 7/2003 | Ahmadi et al. |
| 6,788,702 B1 | 9/2004 | Garcia-Luna-Aceves et al. |
| 7,280,518 B2 * | 10/2007 | Montano et al. ............. 370/338 |
| 7,852,764 B2 * | 12/2010 | Yamaguchi et al. ......... 370/231 |
| 7,869,400 B2 | 1/2011 | Hu et al. |
| 2003/0137993 A1 * | 7/2003 | Odman ........................ 370/468 |
| 2005/0190784 A1 | 9/2005 | Stine |
| 2008/0080472 A1 | 4/2008 | Bertrand et al. |
| 2008/0219286 A1 | 9/2008 | Ji et al. |
| 2008/0279165 A1 | 11/2008 | Hu |
| 2008/0298310 A1 | 12/2008 | Hu |
| 2009/0103501 A1 | 4/2009 | Farrag et al. |
| 2009/0180492 A1 | 7/2009 | Hu |
| 2009/0252102 A1 | 10/2009 | Seidel et al. |
| 2009/0274140 A1 | 11/2009 | Cordeiro et al. |

(Continued)

FOREIGN PATENT DOCUMENTS

KR  10-2008-0067290  7/2008
KR  WO2010005262  1/2010

OTHER PUBLICATIONS

Carlos Cordeiro, et al., "IEEE 802.22: An Introduction to the First Wireless Standard based on Cognitive Radios", Philips Research North America/Wireless Communication and Networking Dept., Briarcliff Manor, USA, Qualcomm Inc., San Diego, CA, Journal of Communication, vol. 1, No. 1, Apr. 2006, pp. 38-47.

(Continued)

*Primary Examiner* — Alpus H Hsu
(74) *Attorney, Agent, or Firm* — Hogan Lovells US LLP

(57) ABSTRACT

A method and system by which base stations in a Wireless Regional Area Network (WRAN), and more generally transceivers in a cognitive radio (CR) system, can communicate to fairly share transmission and reception of scheduled use ("occupancy") of frames on a single channel within a frame-based, on demand spectrum contention system. The method and system disclose how a base station can acquire the scheduled use of a share of the frames available in subsequent superframes of the CR system. The method and system assure fair and efficient access to the transmission channel by using a random number based contention process.

20 Claims, 14 Drawing Sheets

U.S. PATENT DOCUMENTS

| | | | |
|---|---|---|---|
| 2009/0303895 A1* | 12/2009 | Zhang et al. | 370/252 |
| 2010/0009692 A1 | 1/2010 | Shan et al. | |
| 2010/0118808 A1* | 5/2010 | Shan et al. | 370/329 |
| 2010/0195572 A1 | 8/2010 | Sadek et al. | |
| 2010/0227622 A1 | 9/2010 | Mody et al. | |
| 2011/0032912 A1 | 2/2011 | Cordeiro et al. | |
| 2011/0038343 A1* | 2/2011 | Bhatti et al. | 370/330 |

OTHER PUBLICATIONS

Wendong Hu, et al., "Efficient, Flexible, and Scalable Inter-Network Spectrum Sharing and Communications in Cognitive IEEE 802.22 Networks", STMicroelectronics, Inc., University of California, Los Angeles, CA, Feb. 14, 2008, 10 pps.

* cited by examiner

# FRAME BASED, ON-DEMAND SPECTRUM CONTENTION DATA FRAME ACQUISITION

RELATED APPLICATION

The present application relates to and claims the benefit of priority to U.S. Provisional Patent Application Ser. no. 61/158,855 filed Mar. 10, 2009, which is hereby incorporated by reference in its entirety for all purposes as if fully set forth herein. The present application is further related to U.S. patent application Ser. No: 12/721,357, filed Mar. 10, 2010 entitled, "Frame-Based, On-Demand Spectrum Contention Protocol Specifications; U.S. patent application Ser. No: 12/721,374, filed Mar. 10, 2010 entitled, "Frame-Based, On-Demand Spectrum Contention Methodology; U.S. patent application Ser. No: 12/721,387, filed Mar. 10, 2010 entitled, "Frame-Based, On-Demand Spectrum Protocol Vector Messaging; U.S. patent application Ser. No: 12/721,407, filed Mar. 10, 2010 entitled, "Frame-Based, On-Demand Spectrum Contention Source Resolution; and U.S. patent application Ser. No: 12/721,417, filed Mar. 10, 2010 entitled, "Frame-Based, On-Demand Spectrum Contention Destination Resolution; which are each hereby incorporated by reference in their entirety for all purposes as if fully set forth herein.

BACKGROUND OF THE INVENTION

1. Field of the Invention

Embodiments of the present invention relate, in general, to cognitive radio networks and more particularly to on-demand spectrum contention protocol specifications.

2. Relevant Background

Modern society is increasingly dependent on the radio spectrum. The rapid increase in wireless services and devices such as mobile communications, public safety, Wi-Fi, and informational broadcast serve as indisputable examples of how society uses the radio spectrum on a day-to-day basis. Unlicensed transmission bands can play a key role in the wireless ecosystem. Specifically Television ("TV") bands are significantly underutilized.

Cognitive Radio ("CR") is an enabling technology that allows unlicensed radio transmitters to operate in the licensed bands at locations when that spectrum is temporarily not in use. Based on cognitive radio technology the Institute of Electrical and Electronics Engineers ("IEEE"), following a Federal Communication Commission ("FCC") Notice of Proposed Rulemaking in 2004, has fostered 802.22 as an emerging standard for Wireless Regional Area Networks ("WRAN") aiming to provide alternative broadband wireless access in, among other places, rural areas. CR operates on a license-exempt and non-interference basis in the TV band (between 47-910 MHz) without creating harmful interference to the licensed services, which include, among others, Digital TV ("DTV") and Part 74 devices (e.g. wireless microphones).

In a typical deployment scenario, multiple WRAN cells, each of which comprises a base station ("BS") and associated customer premise equipments ("CPE"), may operate in the same vicinity while coexisting with DTV and Part 74 devices. In order to effectively avoid harmful interference to these licensed incumbents, the set of channels on which the WRAN cells are allowed to operate could be quite limited. For example as shown in FIG. 1, residing within the protection contours of DTV 140 and wireless microphones 150, both Network 1 110 and Network 3 130 are only allowed to operate on channel A, while Network 2 1220 may occupy either channel A or B, assuming that in total only 3 channels (channels A, B and C) are available. If WRAN1 and WRAN3 (also referred to herein as Network 1 and Network 2) attempt to perform data transmissions on channel A simultaneously, mutual interference between these collocated WRAN cells could degrade the system performance significantly.

The coexistence (sharing of resources) between incumbent users and secondary users is referred to as incumbent coexistence, and the coexistence between WRAN cells is referred to as self-coexistence. There are two main objectives in self-coexistence: minimizing the self-interference between co-channel overlapping cells, and satisfying the Quality-of-Signal ("QoS") of the cells' admitted service workloads in a dynamic spectrum excess environment.

Distributed, cooperative, and real-time spectrum resource sharing protocol is called On-Demand Spectrum Contention ("ODSC"). The basic mechanism of ODSC is as follows: on an on-demand basis, BSs of the coexisting WRAN cells contend for the shared spectrum by exchanging and comparing randomly generated spectrum access priority numbers via Medium Access Control ("MAC") layer messaging on an independently accessible inter-network communication channel. The contention decisions are made by the coexisting network cells in a distributed way. Only the winner cell, which possesses a higher spectrum access priority compared to those of the other contending cells (the losers), can occupy the shared spectrum.

The effectiveness of the ODSC protocol relies on the availability of an efficient and reliable inter-network communication channel for the interactive MAC message exchanges among network cells. In fact, in addition to supporting cooperative spectrum sharing protocols such as ODSC, a reliable inter-network communication channel is also indispensable to other inter-network coordinated functions for 802.22 WRAN and, in general, other types of cognitive radio based networks (e.g. inter-network synchronization of quiet periods for spectrum sensing, and coordinated frequency hopping). Beacon-based inter-network communication protocol called Beacon Period Framing ("BPF") protocol is another technique used to realize a means for reliable, efficient, and scalable inter-network communication channel sharing by reusing the Radio Frequency ("RF") channels occupied by the network cells.

ODSC is a coexistence protocol that employs interactive MAC messaging on the inter-network communication channel to provide efficient, scalable, and fair inter-network spectrum sharing among the coexisting WRAN cells. To achieve these design goals, ODSC allows the coexisting WRAN cells to compete for the shared spectrum by exchanging and comparing randomly generated contention access priority numbers carried in the MAC messages. Such spectrum contention process is iteratively driven by spectrum contention demands (i.e. intra-cell demands for additional spectrum resources to support data services, and inter-cell demands requesting for spectrum acquisitions). The contention decisions are made by the coexisting network cells in a distributed way, which allows an arbitrary number of cells to contend for the shared spectrum in the proximities without relying on a central arbiter. Instead of behaving selfishly, the competing cells cooperate with one another to achieve the goals of fair spectrum sharing and efficient spectrum utilization.

Currently, before initiating MAC layer messaging of the ODSC protocol, a WRAN cell that is demanding additional spectrum resource first evaluates and selects a channel on which no incumbent is detected. The cell then verifies whether the selected channel can be shared, employing the transmit power control ("TPC") technique, with all other co-channel communication systems in the neighborhood. If it is feasible, the WRAN cell schedules its data transmissions on the selected channels with appropriate TPC settings. Otherwise, ODSC messaging takes place allowing cooperative spectrum contention among WRAN cells to share the target channel in a time-sharing manner.

As can be appreciated by one skilled in the relevant art, overlapping (one-hop) cells must compete for the use of the same spectrum in order to minimize or eliminate mutual interference that may render both cells unreliable. As described in commonly assigned U.S. patent application Ser. No. 12/354,606 entitled, "On-Demand Spectrum Contention for Inter-Cell Spectrum Sharing in Cognitive Radio Networks", upon capturing the use of a particular channel, the occupying WRAN cell, referred to as the ODSC destination ("DST"), announces the occupancy to other cells within one-hop using an ODSC announcement message ("ODSC_ANN"). Other spectrum-demanding WRAN cells, referred to individually as ODSC source ("SRC"), receives the ODSC announcement messages that are regularly broadcasted by the DST cells. If a SRC receives ODSC_ANN messages from multiple DSTs, it randomly selects one of the DSTs. Thereafter the SRC decodes the message from the selected DST and then sends an ODSC request message ("ODSC_REQ") that it is seeking access to the channel occupied by the selected DST. The request message includes a spectrum access priority number ("SAPN"), which is either a floating point number uniformly selected from [0, 1] or a fixed point number uniformly selected from [0, $2^x-1$] (wherein x is the number of binary bits representing the fixed point number). Each DST maintains an ODSC_REQ window so as to allow multiple SRCs to submit ODSC_REQ messages at different time instances without losing its own fair chance to participate in the contention process. At the end of an ODSC_REQ window, if any ODSC_REQs are received, the DST randomly generates its own SAPN and compares it with the smallest SAPN carried in the received ODSC_REQ messages. When the DST's SAPN is smaller (i.e. possesses higher priority), DST sends each SRC an ODSC response message ("ODSC_RSP") indicating a contention failure. Otherwise, the SRC with the smallest SAPN will receive an ODSC_RSP with an indication of contention success meaning that access and control of the spectrum resource (channel) will be relinquished by the DST in favor of the winning SRC. The DST also sends a message to the other SRCs informing the SRCs of a contention failure. As one skilled in the art will recognize other criteria may be used to determine SAPN priority. For example, the contention participant possessing the largest SAPN may win the contention in another embodiment of the invention.

Upon receiving a success notice, the winner SRC broadcasts an ODSC acknowledgement ("ODSC_ACK") indicating the time, Tacq, at which it intends to acquire the channel from the selected DST. All DSTs that are on the same channel as the one being contended for and are within a one-hop distance of the winner SRC respond to the ODSC_ACK by scheduling a channel release to occur at Tacq and broadcast an ODSC release message ("ODSC_REL") to the neighborhood. The ODSC_REL contains information about the channel to release, the channel release time (set to Tacq), and the identification of the winner SRC that will acquire the channel. If the ODSC_ACKs are received from multiple SRCs before the channel is released, a DST selects the earliest Tacq specified in the received ODSC_ACK as the channel release time. This avoids collisions between the neighboring DST and SRC when the channel switching times do not agree. All SRCs that capture the ODSC_REL will also schedule channel acquisitions at Tacq as long as it is determined from the ODSC_REL that the one-hop DST is releasing the channel to either itself or to a winner SRC that is multiple hops away. On the other hand, if multiple ODSC_RELs with different Tacq are received before the channel switching, the earliest Tacq is taken for channel acquisition.

In a large scale network, it is likely that multiple DSTs and multiple SRCs coexist. As the contention processes are fully random and independent, different SRCs could select their own DSTs to contend for the same spectrum resource and the contention outcomes (i.e. winners of the contention and channel acquisition/release times) could be in conflict. The ODSC message flow described above is designed to coordinate the discrepancies between the conflicting contention decisions in order to ensure the stability of the coexistence behaviors and avoid loss of spectrum efficiency across the networks. However, at any one time only one network cell can utilize the shared channel in close proximity. While the network cell occupying the channel sends and receives data over a particular period of time, other neighboring network cells remain idle. This is true even when the network cell occupying the channel may not be fully utilizing the bandwidth of the channel over its allocated period of time. Additionally a network cell demanding a spectrum resource would have to remain idle for a relatively long duration (in the order of plurality of frames) until the channel to share is released by the occupying network cell. As a consequence, such a potentially long turn-around time of channel acquisition may negatively impact the quality of service ("QoS") of time sensitive applications due to the long service interruptions. Spectrum sharing on a finer granularity than a channel (such as frame-based) is advantageous to enhance both the utilization of the operating spectrum and the QoS of the application.

What is needed is a set of general mechanisms for an arbitrary number of distributed network devices to share limited spectrum resources. Although the above description of the ODSC protocol outlines how a protocol is employed for resolving problems of radio resource sharing where the basic unit of the spectrum resource is a radio frequency channel, the same principal of ODSC applicability, without loss of generality, is desirable to other, more fine grained, apportionment of the shared spectrum. It is desirable to apportion the shared radio spectrum so that any effective combination of radio spectrum resource in both the time and frequency domain, such as a frame on a frequency channel or multiple frames on multiple frequency channels, can be effectively shared.

The present invention addresses a mechanism and special features of the ODSC protocol of spectrum sharing on a frame-by-frame basis. This protocol is referred to hereafter as frame-based, on-demand spectrum contention. These and other improvements to the prior art are addressed by one or more features of the present invention.

SUMMARY OF THE INVENTION

A frame-based, on-demand spectrum contention protocol provides fine grained allocation of a limited spectrum resource. In a CR system, determination of spectrum resource allocation is accomplished on a frame-by-frame basis over a predetermined interval of frames. According to one embodiment, a superframe comprising 16 data frames can be apportioned for use among a plurality of overlapping network cells such as WRAN cells so as to better and more equitably distribute a shared spectrum resource.

For a predetermined period of time, a WRAN cell, occupying one or more data frames of a superframe, senses whether other WRAN cells within one hop are seeking access to same occupied frames. Likewise a WRAN cell seeking additional spectrum resources can examine the CR network topology to determine to which WRAN cell a request for additional resources should be sent.

After a WRAN cell occupying a particular frame (the target frame) receives one or more external demands for access to the target frame of a superframe (the occupying cell can also vie to maintain control of the target frame), a contention is declared. (Note: in the operating environment, the WRAN cell does not possess any preferential right to a target frame) A WRAN cell initiating access demand and sending a contention request for the target frame is called a contention source. The WRAN cell currently occupying the target frame and receiving the contention request(s) from one or more contention source is called a contention destination. Each request includes a spectrum contention number generated, according to one embodiment of the present invention, based on a random process. Upon receiving the requests and the spectrum contention number from a neighboring contention source, the contention destination cell currently occupying the targeted frame generates its own spectrum contention number and compares all of the generated spectrum contention numbers (including numbers generated by the destination cell and those numbers received from a contention source) to determine a winner.

According to one embodiment of the present invention, the smallest spectrum contention number of the cells vying for access to the shared spectrum resource will win the contention. A winner is declared and an announcement is broadcast to all cells within one hop of the contention destination of the targeted frame, indicating the winner of the targeted frame. The winning cell will, at the end of a certain period, (normally the superframe) thereafter occupy the targeted frame. Upon receiving the broadcast message announcing the winner, the winning cell, if different than the current occupier of the targeted frame, broadcasts to all of its one hop neighbors of impending occupancy of a targeted frame. Thus, networks cells that may not be within one hop of the releasing cell will nonetheless be notified of the impending occupancy of a targeted frame by the winning cell.

According to one embodiment of the present invention, communication of control messages for frame-based, on-demand spectrum contention (for example frame occupancy requests) are wirelessly conveyed during a beacon frame window attached to the trailing edge of each data frame. Over the span of a 16 frame superframe, 16 beacon frame windows are available to provide information throughout the CR network of frame allocation. For example, frames 1 though 4 can be used for sensing contention requests. The contention resolution can occur during frames 5 and 6 with a response broadcast on frame 7. Acknowledgements by the winning frames can be broadcast on frame 8 with a release of the frame broadcast on frame 16.

Other informational communication schemes operable to convey synchronization and frame allocation data amongst a plurality of cells are equally applicable to the various embodiments of the present invention as are the factors used to determine which cell in the contention process will gain access to the contended spectrum resource.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
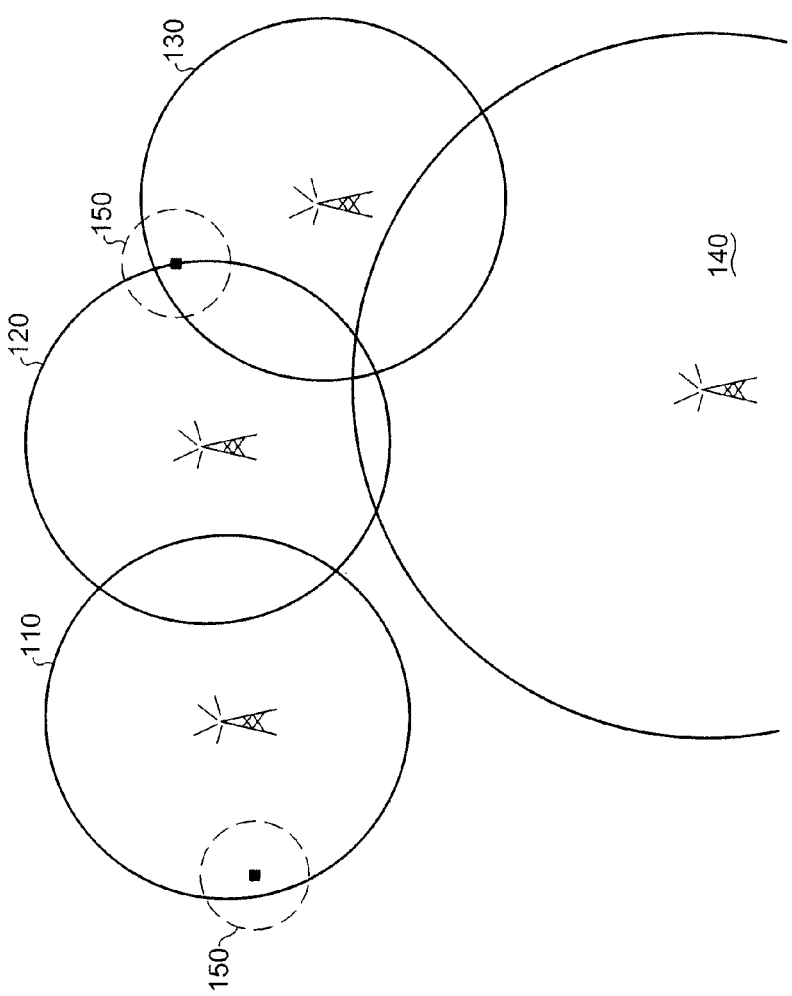
FIG. 1 shows an exemplary overlapping network configuration of a TV wireless system employing cognitive radios as would be known to one of reasonable skill in the relevant art.

The Figures depict embodiments of the present invention for purposes of illustration only. One skilled in the art will readily recognize from the following discussion that alternative embodiments of the structures and methods illustrated herein may be employed without departing from the principles of the invention described herein.

GLOSSARY AND ACRONYMS

As a convenience in describing the invention herein, the following glossary of terms is provided. Because of the introductory and summary nature of this glossary, these terms must also be interpreted more precisely by the context of the Detailed Description in which they are discussed.

Spectrum Contention Source ("SC-SRC")—the WRAN cell that is demanding additional spectrum resources (i.e. data frames transmission opportunities on a TV channel) and is initiating an interactive spectrum contention process with the target Spectrum Contention Destination.

Spectrum Contention Destination ("SC-DST")—a WRAN cell that is the target of the spectrum contention request initiated by the SC-SRC, and is the occupier of the spectrum resources being requested to be shared with the SC-SRC.

Spectrum Contention Number ("SCN")—the contention number randomly generated by SC-SRCs and SC-DSTs for determining the priority of spectrum access.

Spectrum Contention Request ("SC-REQ")—This is a unicast request message transmitted by the SR-SRC for initiating the spectrum contention process.

Spectrum Contention Response ("SC-RSP")—This is a unicast response message transmitted by the SC-DST responding to the requesting SC-SRC with regard to the contention results.

Spectrum Contention Acknowledge ("SC-ACK")—A broadcast acknowledgement message transmitted by the winner SC-SRC indicating the confirmation of spectrum acquisitions.

Spectrum Contention Release ("SC-REL")—A broadcast message transmitted by the granting SC-DST indicating the announcement of the spectrum releases.

Target Frame—a particular frame in a superframe which is the focus of a contention process between two or more overlapping network cells.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

A frame-based, on-demand spectrum contention protocol enables dynamic spectrum sharing for coexistence operations among a plurality of overlapping wireless network cells. As previously described, wireless cells in a CR communication system contend for the use of shared resources. As a means to efficiently and effectively utilize the available communication spectrum, CR systems initiate a competitive process where each system contends for the use of the same resource.

As is well known to one of ordinary skill in the relevant art, wireless communication between a base station ("BS") and one or more Consumer Premise Equipment ("CPE") within its area of influence is accomplished via one or more channels. As discussed, in commonly assigned U.S. patent application Ser. No. 12/354,606, entitled "On-Demand Spectrum Contention for Inter-Cell Spectrum Sharing in Cognitive Radio Networks" an interactive message exchange can be undertaken to resolve contentions for the use of a particular channel. In such situations, using the ODSC protocol, a plurality of base stations in coexisting (overlapping) WRAN cells contend for the use of a particular channel of a shared spectrum. As a result of the contention process, a single base station gains complete access to a particular channel until another contention for the shared spectrum is raised.

During the period of time in which the winning base station has use of the channel, other coexisting base stations are precluded from communicating. The present invention provides a message-based, demand driven, distributed spectrum sharing protocol for use in contention based CR communication systems. Rather then resolving shared spectrum resource contentions on a coarse-grain, channel-by-channel basis, the present invention enables a fine-grain, frame based, resolution of shared spectrum contentions. While the embodiments of the present invention are largely described with regard to wireless regional area networks, one of reasonable skill in the art will understand that the concepts presented herein are equally applicable to any wireless network and cognitive radio communication system.

According to one or more embodiments of the present invention, messages are exchanged between base stations contending for a commonly shared resource to determine their respective rights to that resource. While the present invention is primarily described with reference to the coexistence contention process for a shared resource associated with a single channel, one of ordinary skill in the relevant art will recognize that the same contention protocol is equally applicable to contentions involving multiple frames among multiple channels or generally a fractional combination of channels in both the time and frequency domain. Indeed a likely implementation of the present invention involves the resolution of contentions from a plurality of base stations over a plurality of shared resources associated with a plurality of channels involving multiple frames in both the time and frequency domain. The present invention contemplates the protocols presented herein are scalable to any CR communication system regardless of size.

By using random spectrum contention numbers generated by each base station, the present invention provides a fair and robust means for shared spectrum contention resolution with low computational overhead and high quality-of-signal results.

Unlike the traditional contention based medium access schemes such as Aloha and Carries Sense Multiple Access ("CSMA"), ODSC protocol, as described above, takes distinguishable approaches for resolving channel access contention and mitigating access collision, aiming to improve the spectrum access efficiency. Due to the lack of exact knowledge of when the neighboring systems will transmit, a wireless system using Aloha or CSMA protocol generally resolves the access contention by deferring data transmission for a random period, and in the case of collision, re-initiates the contention process by setting a potentially much larger random period for the transmission deferral (e.g. using the exponential random back-off mechanism) in order to reduce the chance of reoccurring collisions.

A better approach and according to one embodiment of the present invention, ODSC allows a wireless system (IEEE 802.22 WRAN in the present case) to compete for the channel access without resorting to any transmission deferral which clearly sacrifices the spectrum efficiency. This is because the contention resolution process is carried out in parallel with the on-going data services. Moreover, as the spectrum contention is resolved by comparing the spectrum access priority numbers that are randomly selected from a very large pool of values, the likelihood of access collision among coexisting wireless systems using ODSC is effectively minimized.

Figure 2:
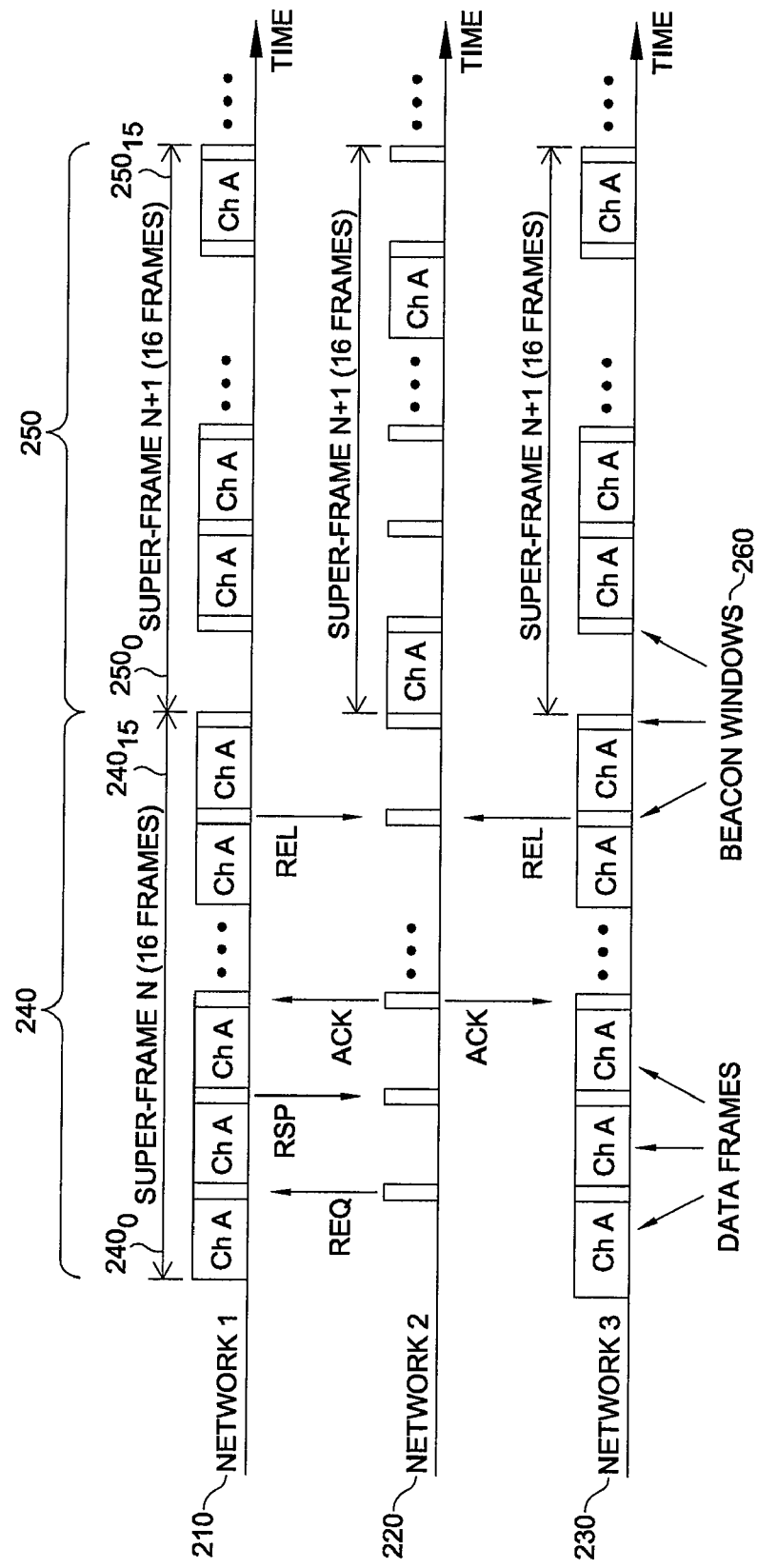
FIG. 2 is a high level block diagram depiction of a superframe structure utilized in a frame-based, on-demand spectrum contention protocol according to one embodiment of the present invention.

One facet of the present invention is its frame-by-frame contention resolution within each channel's superframe. FIG. 2 is a graphical depiction of a frame-based, on-demand ODSC communication system. In the CR communication system shown in FIG. 2, three BSs as originally depicted in FIG. 1 contend for the communication resources available in channel A. Data conveyed on channel A is packaged into discrete frames and superframes. In this particular embodiment, a superframe is comprised of 16 frames. In other implementations, the number of frames within a superframe may vary and indeed the entire concept of a superframe with respect to its relationship to individual data frames or packets may vary without departing from the scope and intent of the present invention.

Each line shown in FIG. 2 represents frame allocation to a BS defined network. Network 1 210 as shown in FIG. 1 is the top line while Network 2 220 is the second line and Network 3 230 is the bottom line. As shown in FIG. 1, Network 2 220 overlaps with Network 1 210 and Network 3 230. Network 1 210 however is independent of Network 3 230. Thus the same spectrum resources can be used simultaneously by Network 1 210 and Network 3 230. The contention for the available spectrum resource of channel A is therefore between Network 2 220 and Networks 1 and 3 210, 230.

A superframe 240, 250 includes, according to one embodiment of the present invention, 16 individual data frames $240_{0-15}$, $250_{0-15}'$. Each data frame $240_{0-15}$, $250_{0-15}$ is separated by a beacon window 260. Each data frame $240_{0-15}$, $250_{0-15}$ and each beacon window 260 are time partitioned and fixed in size. And, as can be seen in FIG. 2, the superframes of each network 210, 220, 230 are, in this example, synchronized. In other embodiments of the present invention synchronization is not required.

The beacon window 260 (also referred to herein as a beacon period or beacon period frame) allows coexisting WRAN cells such as Network 1 210 and Network 2 220, and Network 2 220 and Network 3 230 to exchange coexistence beacons for inter-network communication. Other inter-network communication protocols and systems can be used without detrimentally impacting the unique and non-obvious features of the present invention. The ability for contending networks to communicate resource needs and to communicate resource management allocations is a fundamental aspect of the present invention.

These and other implementation methodologies for inter-network communication can be successfully utilized by the frame-based, on-demand spectrum contention protocol. These implementation methodologies are known within the art and the specifics of their application within the context of the present invention will be readily apparent to one of ordinary skill in the relevant art in light of this specification. For example inter-cell communication can be accomplished using a dedicated communication channel, one or more dedicated communication frames within the superframe, back channels, a wired interface such as Ethernet or other wired communications systems, or any other means by which two or more base stations can convey spectrum resource allocation information. Moreover the timing of the communication is flexible and can be adjusted to meet the needs of the network without detrimentally altering the efficiency and success of the present invention.

Figure 3:
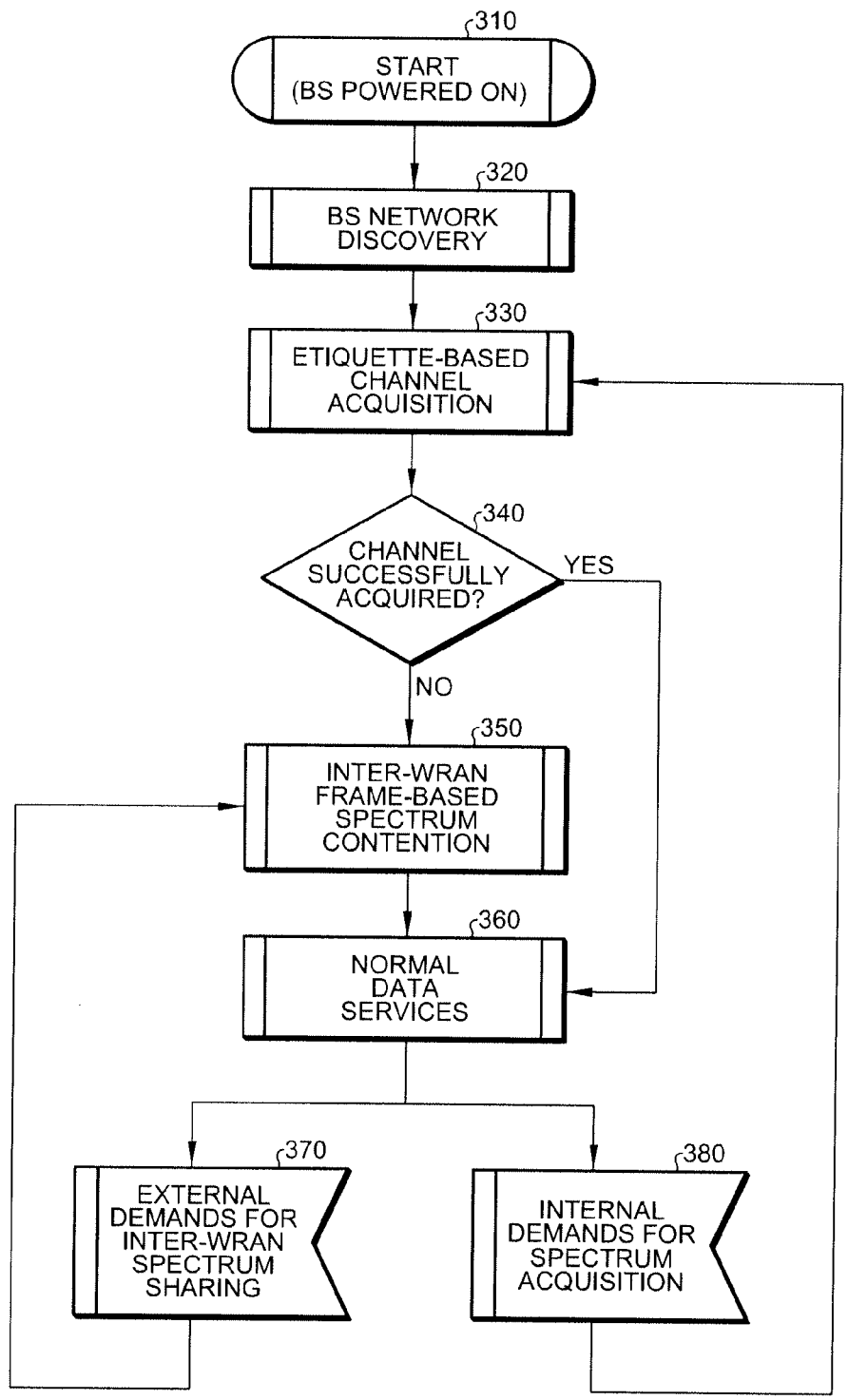
FIG. 3 is a top level flowchart for an inter-WRAM coexistence procedure employing frame-based, on-demand spectrum contention protocols according to one embodiment of the present invention.

FIG. 3 is a top level flowchart showing inter-WRAN coexistence procedures. In the following description it will be understood that each block of the flowchart illustrations, and combinations of blocks in the flowchart illustrations, that follow can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As a BS is powered on 310 it begins a BS Network discovery process 320. Other BS within its range of operation are identified directly and by communicating with CPEs within its area of coverage other overlapping network cells can be identified. During this period of discovery, each BS identifies TV channel occupancies of neighboring WRAN cells and self-coexistence window reservations of the neighboring WRAN cells. Finally, individual frame reservation patterns (as described hereafter) of each neighboring WRAN cell on specific TV channels are determined. Based on its network discovery, the BS undergoes an etiquette-based channel acquisition 330 which is to identify and acquire an available TV channel without detrimentally affecting incumbent device operation and neighboring WRAN cells. For example based on the TV channel occupancy by incumbent devices and available channel spectrum resources, a new BS may determine that it should operate on channel A along with any other overlapping base stations. Thus, the new BS may have to contend for a limited shared spectrum resource.

Upon choosing one or more channels on which to operate, a base station attempts to acquire 340 exclusive use of that (those) channel(s). To do so, a request is sent out by the base station to determine whether any other base stations are currently using the channel. When no response to the request is received, the requesting BS issues an announcement of its use and effective ownership of the channel. Shortly thereafter, the BS can use the channel for normal data services 360.

A more frequent response to the base station's attempt to acquire exclusive use of a channel is a denial indicating that another base station or stations are currently using that spectrum for data services. According to one embodiment of the present invention the requesting base station enters an inter-WRAN frame-based, on-demand spectrum contention process 350 for co-channel sharing. (explained in detail below with reference to subsequent figures). Upon successful resolution of that process the base station gains access to at least a portion of the spectrum and begins normal data services 360.

While the base station utilizes the spectrum for data services, other demands or requests for the shared spectrum may arise. These requests or demands may be externally or internally generated. An external demand for inter-WRAN spectrum sharing 370 may arise from another BS joining the network or an existing BS in the network seeking additional spectrum resources. Another external demand may be an increased utilization of the spectrum by the incumbent (TV) resulting in a reduction in overall spectrum availability. Similarly, an internal demand for spectrum acquisition 380 may arise from a base station's realization that its allocated shared spectrum is insufficient to meet its data services requirements. For example, CPEs within its own cell may demand additional spectrum resources. Thus, the BS internally issues a demand for additional spectrum resources.

When a BS realizes that it possesses an internal demand for additional spectrum resources 380, it again initiates an etiquette-based channel acquisition procedure 330. The base station hence reexamines the spectrum to determine if it can acquire another channel. If the channel is acquired, the BS begins normal data services 360 and thereafter determines whether it now possesses enough of the spectrum to meet its internal needs. If an additional (or different) channel is not acquired then it returns to, and reinitiates an inter-WRAN frame-based spectrum contention in hopes to gain more of the existing shared spectrum.

If an external demand for inter-WRAN spectrum sharing 370 is received each participating BS (WRAN) again competes for a portion of the shared resources. By continually evaluating the allocation of shared resources, each WRAN gains an equal share of the shared resource. FIG. 2 shows a representation of frame-based, on-demand spectrum contention allocation. Shown are frames associated with two superframes that are allocated among three overlapping WRAN cells.

Referring again to FIG. 2, each superframe 240, 250 of a shared channel comprises 16 data frames $240_{0-15}$, $250_{0-15}$. In the first superframe 240 the first 3 data frames of channel A $240_0$, $240_1$, $240_2$ are being utilized by Network 1 210 and Network 3 230 without contention. Recall that Network 1 210 and Network 3 230 do not overlap. During this time period frames 0-3, Network 2 is unable to transmit or receive data and is thus idle.

In the second superframe 250, Network 2 220 occupies the initial data frame $250_0$ to the exclusion of Network 1 210 and Network 3 230. Thus, for frame $250_0$ Networks 1 210 and 3 230 are idle. In this manner each of the three Networks 210, 220, 230 can be provided shared access to the limited spectrum resource increasing the overall quality-of-signal in each network.

FIG. 2 additionally depicts the presence of a beacon window 260 following each data frame 240, 250. Upon the initiation of an inter-WRAN frame-based ODSC these beacon windows are used to carry request, response or acknowledgement messages between the participating WRAN cells.

Figure 4:
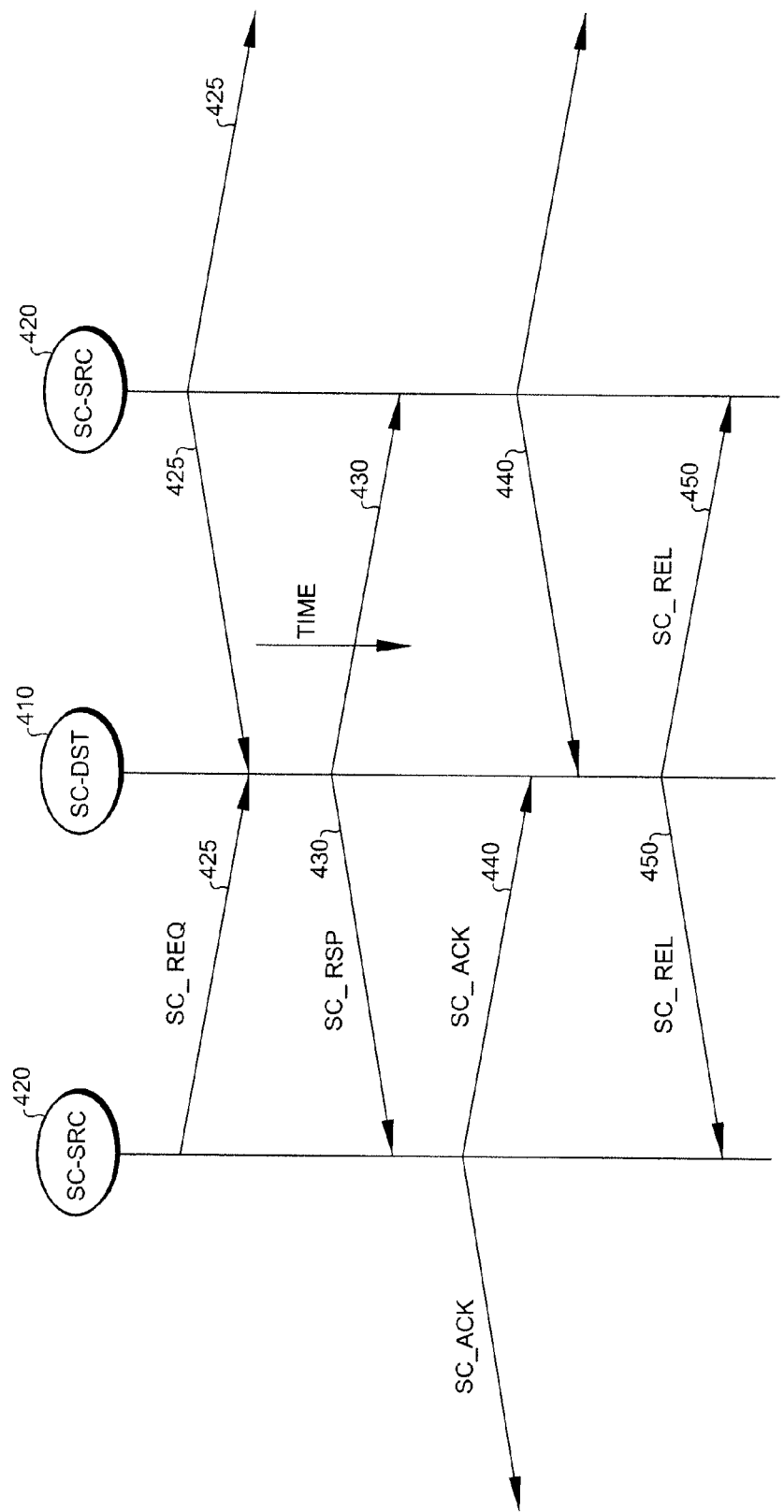
FIG. 4 is a graphical depiction of a typical message flow carried out via beacon windows of the frame-based, on-demand spectrum contention protocol according to one embodiment of the present invention.

FIG. 4 is a graphical depiction of a typical message flow carried out via beacon windows of the frame-based, on-demand spectrum contention protocol according to one embodiment of the present invention. In the scenario shown in FIG. 4, three WRAN cells are contending for a shared frame resource. Returning again to the communication network shown in FIG. 2, assume that during an initial etiquette-based channel acquisition process, Network 2 220 acquired sole use of channel A. Shortly thereafter, Network 1 210 and Network 3 230 joined the communication network with their cells overlapping as shown. The message flow in FIG. 4 is an example of Network 1 210 and Network 3 230 attempting to gain shared access to the spectrum currently controlled by Network 2 220.

SC-SRC is a designation placed on those cells that serve as the source of contention. In this case two WRAN BSs, Network 1 210 and Network 3 230, are seeking additional spectrum resources and are thus designated as a spectrum contention source 420 or SC-SRC. Similarly, the WRAN cell that currently is in control of a spectrum resource is designated as the destination to which the contention is directed or SC-DST 410. As one of reasonable skill in the relevant art will recognize, the title of SC-DST and SC-SRC is solely based on which cell currently controls or seeks a particular shared spectrum resource. As the allocation of the shared resource changes, so too will the respective labels. And, indeed, a particular cell can for one portion of the spectrum be a destination, meaning it currently controls the spectrum, while at the same time be a source for a contention request as it seeks additional spectrum resources for data services.

Turning attention back to FIG. 4, each contention source, SC-SRC issues separate spectrum contention requests 425 for additional shared resources. Note that the requests for additional resources can be issued at different times but, nonetheless, must be within a certain window so as to be accepted for consideration. According to one embodiment of the present invention, each SC-REQ includes a spectrum contention number generated by the SC-SRC. As will be described later, the spectrum contention number is a number used by the SC-DST to determine resource allocation. Upon receipt of a request or requests, the cell which is currently in control of the resource, SC-DST, undergoes a spectrum contention analysis using the gained various spectrum contention numbers.

In addition to the source cells requesting access to the shared resource, the destination may also participate in the contention. Thus, in the present example, three cells are competing for the same shared resource. Recall that this contention is taking place on a frame-by-frame basis. As the contention analysis takes place, the destination cell maintains control and use of the shared resource. While the entire contention process may occur over the length of a single frame, other embodiments of the present invention, a predetermined period of time, can be specified giving the SC-DST a time period of known data frames. For example, assume that a contention for a shared resource has been received and that evaluation of the contention algorithms takes place over 3 frames. During those 3 frames the SC-DST can prioritize data services knowing that the allocation of the spectrum may soon be diminished. Typically, the contention process is conducted and completed within the time period elapsed during a superframe or, in one embodiment, 16 data frames. However, the resolution of a contention can be arbitrarily set based on the needs of the CR communication network.

Upon completion of the contention process, the SC-DST will determine which network cell, in this case Network 1 210, Network 2 220 or Network 3 230 will gain (or maintain) control of the shared resource. According to one embodiment of the present invention, each destination cell knows of the topology of its one-hop neighbors. Thus, in this example, Network 2 220 is aware that while both Network 1 210 and Network 3 230 are within one hop of Network 2 220, Network 1 210 and Network 3 230 can operate autonomously. Thus, if either Network 1 210 or Network 3 230 wins the contention, the other cell can also use the shared resource.

As shown in FIG. 4, the destination cell, SC-DST, broadcasts a response 430 providing the results of the inter-WRAN frame-based spectrum contention to each of its one-hop neighbors in the form of a SC-RSP message. Each cell receiving the message responds with a similar broadcast acknowledgement message 440 (SC-ACK) stating whether or not it has received access to the shared resource.

Assume in this case that Network 1 210 had won the inter-WRAN frame-based spectrum contention. The SC-RSP message 430 broadcast from Network 2 220 would indicate that Network 1 210 won the contention. Included in the message, according to one embodiment of the present invention, would be a proposed release time of the resource. The message may also include that Network 3 230 will also have use of the shared spectrum as Network 1 210 and Network 3 230 do not coexist.

The broadcast acknowledgement message 440 from each SC-SRC (Networks 1 210 and 3 230) inform its one-hop neighbors of its impending use (or non-use) of a particular shared resource. In this case both Network 1 210 and Network 3 230 would be informing all of their one-hop neighbors that they are about to gain control of a particular frame-based shared resource.

Once the acknowledgement message 440 has been sent, the SC-DST (Network 2 220) issues a release (SC-REL) 450 relinquishing control of the shared spectrum resource. At that point Network 1 210 and Network 3 230 change their designations from contention source, to contention destination. Likewise, Network 2 220, with respect to this shared spectrum resource, can issue a spectrum contention request making it a spectrum contention source. Assuming that a single message can take place during any one beacon window 260, the entire contention, response, acknowledgement and release can occur in as little as 4 frames of a superframe.

The present invention discloses a frame-based, on-demand inter-WRAN spectrum contention protocol. The fine-grained nature of the shared spectrum contention process can place a single WRAN acting as both a contention source and as a contention destination within a single superframe on any given channel. Indeed, such a contention resolution scheme could play out for each frame within each superframe.

In the above scenario, Network 1 210 and Network 3 230 are seen as having identical allocations to the shared spectrum resource. One of reasonable skill in the relevant art will recognize, however, that the example presented herein is a simplified version of what is undoubtedly a more complicated scenario. The above scenario assumes that no other one-hop neighbors of Network 1 210 and Network 3 230 that are not affiliated with Network 2 220 have been operating on the same shared resource. For example, it is entirely possible that while Network 1 210, the winner of the contention with Network 2 220 and Network 3 230, may be able to gain operational control of a shared resource, Network 3 230 may have another coexistence network, Network 4 (not shown) that is also operating on, and contending for, the same frame of the same channel. In that inter-WRAN frame-based spectrum contention, Network 4 may have maintained control of the shared resource such that upon release by Network 2 220, only Network 1 210 and not Network 3 230 may be able to utilize the shared resource.

As previously described, the WRAN BS in control of a spectrum resource determines the winner of contention over that resource. In doing so, the base station gathers spectrum contention numbers from each participating WRAN cell and evaluates the values based on, in one embodiment of the present invention, a spectrum contention algorithm.

According to one embodiment of the present invention, the spectrum contention algorithm is of the form:

| Spectrum Contention (N, WRAN, SCN, Frame) |
|---|
| 1     $SCN_{winner}(\text{Frame}) \leftarrow \min_{i=0}^{N}\{SCN[i]\}$ |
| 2     for i ← 1 to N |
| 3        if $SCN[i] == SCN_{winner}$ |
| 4           return $WRAN_{winner}(\text{Frame}) \leftarrow WRAN[i]$ and $SCN_{winner}(\text{Frame})$ |

Where in the algorithm,
N: total number of contending WRAN cells;
WRAN: the array of IDs of the contending WRAN cells, WRAN[i] for i←1 to N;
SCN: the array of spectrum contention numbers of the contending WRAN cells, in which SCN[i] is the spectrum contention number of WRAN[i] for i←1 to N;
Frame: the data frame (spectrum resource) being contended for; (target frame)
$SCN_{winner}$ (Frame): the winner spectrum contention number for accessing the Frame; and
$WRAN_{winner}$ (Frame): the ID of the winner WRAN cell to access the Frame.

Each contending WRAN cell produces and sends to the destination cell a spectrum contention number. According to one embodiment of the present invention the spectrum contention number, $SCN_i$, for WRAN cell i, $WRAN_i$, is generated, according to one embodiment of the present invention, as:

$SCN_i = RANDOM(0, 2^x-1)$.

As presented above, the winning WRAN cell of a frame-based, on-demand inter-WRAN spectrum contention is the WRAN cell possessing the smallest spectrum contention number. One reasonably skilled in the relevant art will recognize that other techniques can be used to generate a spectrum contention number. Indeed, the algorithm presented above for resolution of a spectrum contention may vary without departing from the scope contemplated by the present invention.

As shown above, a spectrum contention destination collects, over a predetermined period of time, one or more spectrum contention numbers wherein each spectrum contention number is generated and issued to the destination cell by a WRAN source cell contending for use of the shared spectrum. The destination cell builds from the received spectrum contention numbers an array comprised of each received SCN. Each SCN in the SCN array is associated with its generating WRAN identification number. A similar array of contending WRAN cells is fabricated and comprised of the WRAN identification numbers.

According to one embodiment of the present invention, the determination of a minimum SCN necessarily identifies a WRAN cell associated with that minimum SCN. Thus, for a particular shared resource frame, a winning WRAN cell, $WRAN_{winner}$, is determined. Thereafter, the winning WRAN cell ID along with the winning SCN is broadcast from the WRAN cell conducting the contention.

Figure 5:
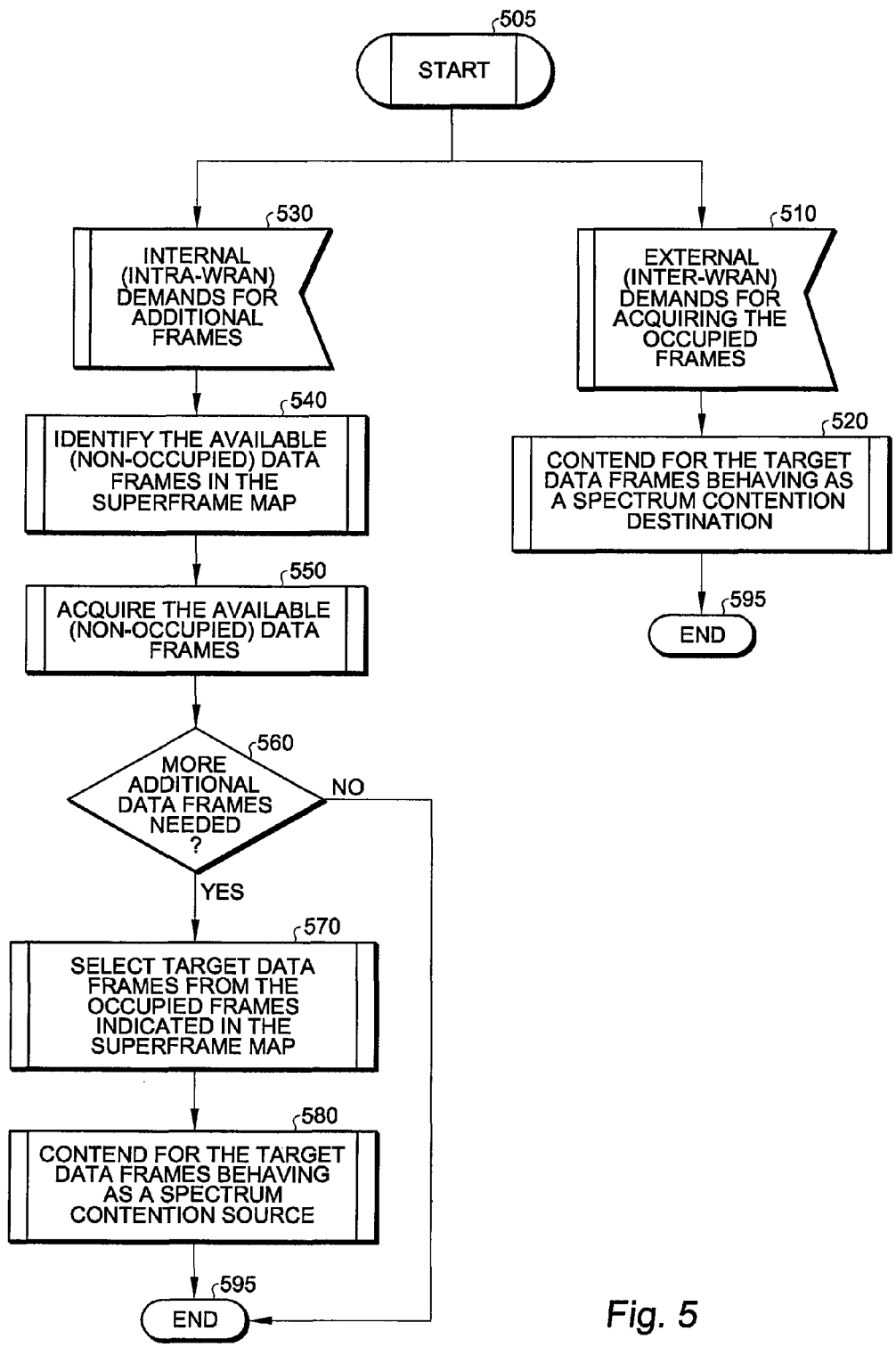
FIG. 5 shows a flowchart of an overall procedure for frame-based, on-demand spectrum contention according to one embodiment of the present invention.

FIG. 5 shows a flowchart of a frame-based, on-demand spectrum contention protocol according to one embodiment of the present invention. Upon initiation 505 of a contention, (block 350 of FIG. 3) the destination or deciding WRAN cell determines whether the contention is based on an internal or external demand for additional access to the shared spectrum resource.

Recall that an external demand 510 for acquiring access to the occupied frames may be the result of a new or existing base station seeking more data service bandwidth. Upon determining that an external inter-WRAN demand for acquiring access to the occupied frames 510 exists, the destination WRAN cell initiates a contention 520 for the targeted data frames while still behaving as a spectrum contention destination (explained in detail with reference to FIG. 9). As the spectrum contention destination, the WRAN cell is in control of the evaluation process of the spectrum contention numbers, although the process itself is equitable and gives the destination cell no inherent advantages.

When a determination is made that an internal intra-WRAN demand 530 for additional frames occurs, the destination WRAN cells first identify 540 available (non-occupied) frames in the superframe structure. This is done with reference to a superframe MAP. The superframe MAP identifies frame allocation within a superframe of a particular channel for a specific one hop WRAN neighborhood. Recall that an internal demand occurs when a destination or controlling WRAN cell experiences an increased need for data band width due to internal alterations such as more usage by or presence of CPEs within its area of coverage. Since the increased demand is internal, it is likely that the current state of shared spectrum allocation is not challenged by the other participating WRAN cells. Thus, it may be possible to reallocate resources without having to enter a full contention procedure as a contention may result in a decrease of the destination's current resource allocation.

Figure 6:
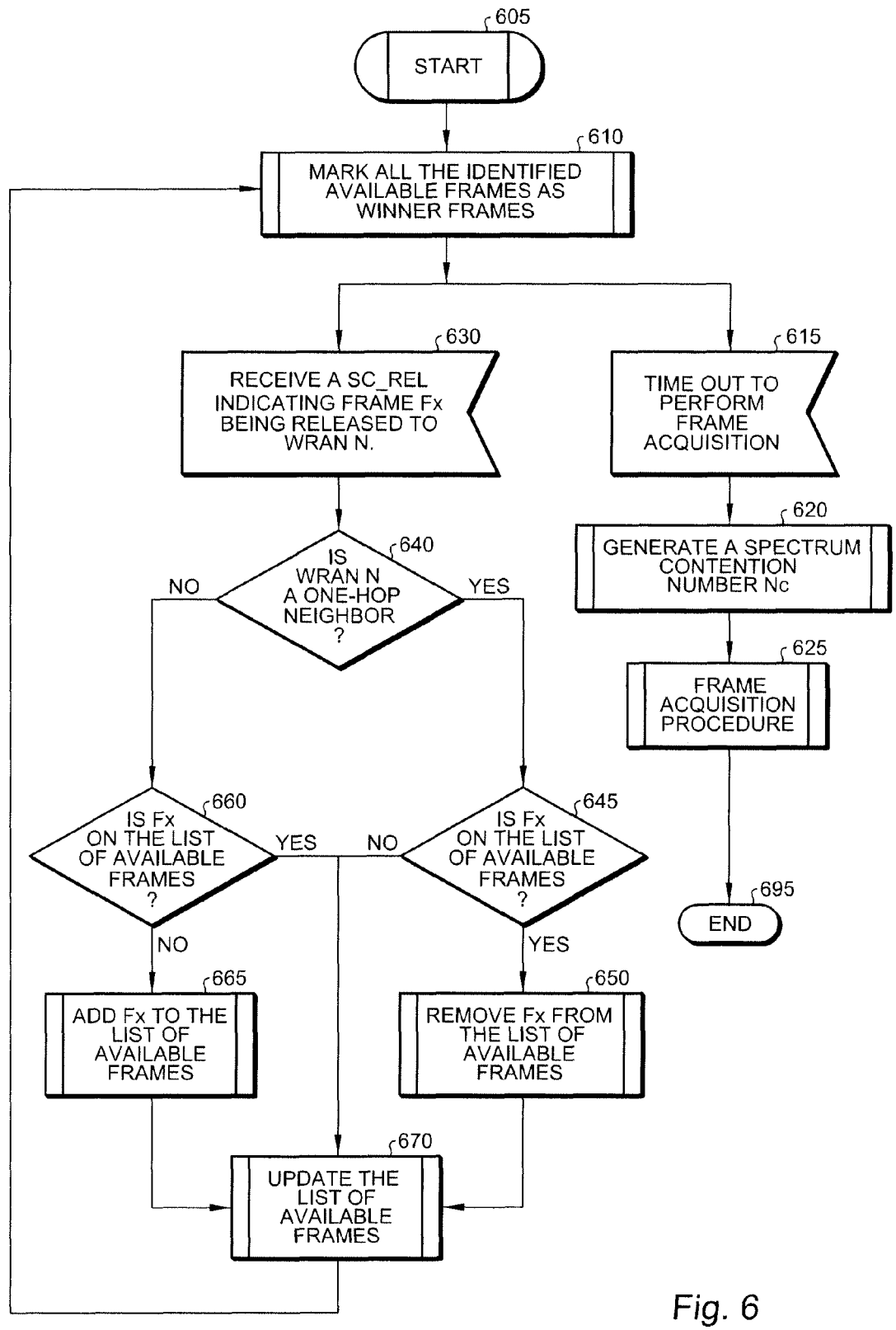
FIG. 6 depicts a high level flowchart of one method embodiment of the present invention for determining the availability of data frames in an frame-based, on-demand spectrum contention environment.

Once available data frames are identified 540, a course of action is undertaken to acquire 550 one or more of the non-occupied data frames so as to meet the increased internal demand (explained in detail with reference to FIG. 6). Upon acquisition of the new data frames, a query is made 560 whether additional data frames are needed to meet the internal intra-WRAN spectrum demand.

If no additional frames are needed, the process ends 595 (returning to block 360 of FIG. 3). Note that when a destination WRAN cell experiences an internal demand and the superframe structure includes non-occupied or non-used data frames, a contention for shared spectrum resources is not necessary.

When the acquisition of non-occupied frames fails 560 to meet the increased internal need, the destination WRAN cell selects 570 target data frames from the occupied data frames in the superframe MAP. Once selected, the WRAN cell seeking additional data frames based on an internal intra-WRAN spectrum demand initiates a contention 580 (explained in detail with reference to FIG. 8). The contention 580 is for the targeted frames and does not involve the frames which it currently occupies. Thus, the cell seeking a contention to resolve its internal intra-WRAN spectrum demand assumes the role of a spectrum contention source, SC-SRC. To the other WRAN cells using the shared spectrum resources, an external demand 510 for their data frames has just occurred.

Upon receiving the spectrum contention request the cell(s) occupying the targeted frames conduct a contention as previously described. As will be understood by one of reasonable skill in the relevant art, the result of the contention is unpredictable. It is possible that the cell experiencing the internal intra-WRAN spectrum demand may win the contention, gaining access to new data frames thus resolving its internal demand. However, the losing WRAN cell may then experience an internal demand for additional data frames. The losing cell now enters the flowchart shown in FIG. 5 to resolve its demand by determining whether the demand is internal 530 or external 510. The contention may also result in the WRAN cell seeking the additional cells losing the contention. In such a case, no additional resources have been gained from the contention which will likely spark the need for an additional contention.

In conjunction with the acquisition of the additional data frames from either an externally or internally generated demand, a WRAN cell needs to determine the availability of data frames within the superframe structure in which it is operating. FIG. 6 represents a high level flowchart of one method embodiment of the present invention for determining the availability of data frames in an on-demand shared spectrum environment.

Determining frame availability begins 605 with marking 610 all of the known available (non-occupied) frames within a superframe structure as winner frames. With the frames identified as winner frames, a WRAN cell seeking additional data frames can initiate acquisition of the winning designated frames should no other claim of ownership exist. Thus, the procedure's next task is to determine whether another WRAN cell has gained access and control of a particular data frame. Recall that each WRAN cell possesses a sensing or listening (quiet) period in which it gathers information broadcasted from other base stations. It is during this period of the beacon window 260 in which a WRAN cell looking to gain additional frames would find out if another nearby WRAN cell has gained ownership of a particular data frame. Upon time out 615 of that sensing period, a WRAN cell which has designated a frame as a winning frame can initiate acquisition procedures. Said another way, since no other WRAN cell has indicated that is has a controlling interest in a particular frame, it is free to acquire the data frame for its own use.

However, it is possible that during this sensing period the WRAN cell may receive 630 a spectrum contention release message, SC-REL. Such a message would indicate that a particular frame, $F_x$, has been released to WRAN N where N is the WRAN identification number. Just as previously discussed in reference to FIGS. 1 and 3, it is possible that the WRAN N and the WRAN cells seeking additional data frames are not within one-hop of each other. Thus, upon receiving such a SC-REL message, the WRAN cell determines 640 whether WRAN N is a one-hop neighbor. When WRAN N is not a one-hop neighbor, then the release of a particular frame to WRAN N does not preclude the WRAN cells seeking additional data frames from seeking their acquisition. In such a case a query is made to determine whether $F_x$ is on the list of available frames. If it is, the list of available frames is updated 670 (in this case confirming no change) and all available frames are again marked as being winning frames 610.

When the query determines that $F_x$ is not on the list of available frames, $F_x$ is added 665 to the list and the list is updated 670. This iterative inquiry operates until a robust list of available frames is determined, all of which are marked as winner frames 610.

When the inquiry of whether WRAN N is a one hop neighbor 640 is affirmative, an additional inquiry is made with respect to the status of $F_X$ and its existence on the list of available frames 645. If $F_X$ is not on the list of available frames no change is necessary as $F_X$ is not available. However, if $F_X$ is on the list of available frames it is accordingly removed 650. Since WRAN N is a one hop neighbor and a REL message has been issued indicating $F_X$ has been released to WRAN N, it cannot also be occupied by another one hop WRAN cell.

With the list of available frames constructed and each available frame marked as a winner frame 610, the inquiry once again turns to see if a source contention frame release message is received. When no such message is received during a sensing period 615, a spectrum contention number $N_C$ is generated 620 and the frame acquisition procedure 625 (explained in detail with reference to FIG. 7) is initiated 695 (returning the process to block 560).

Figure 7:
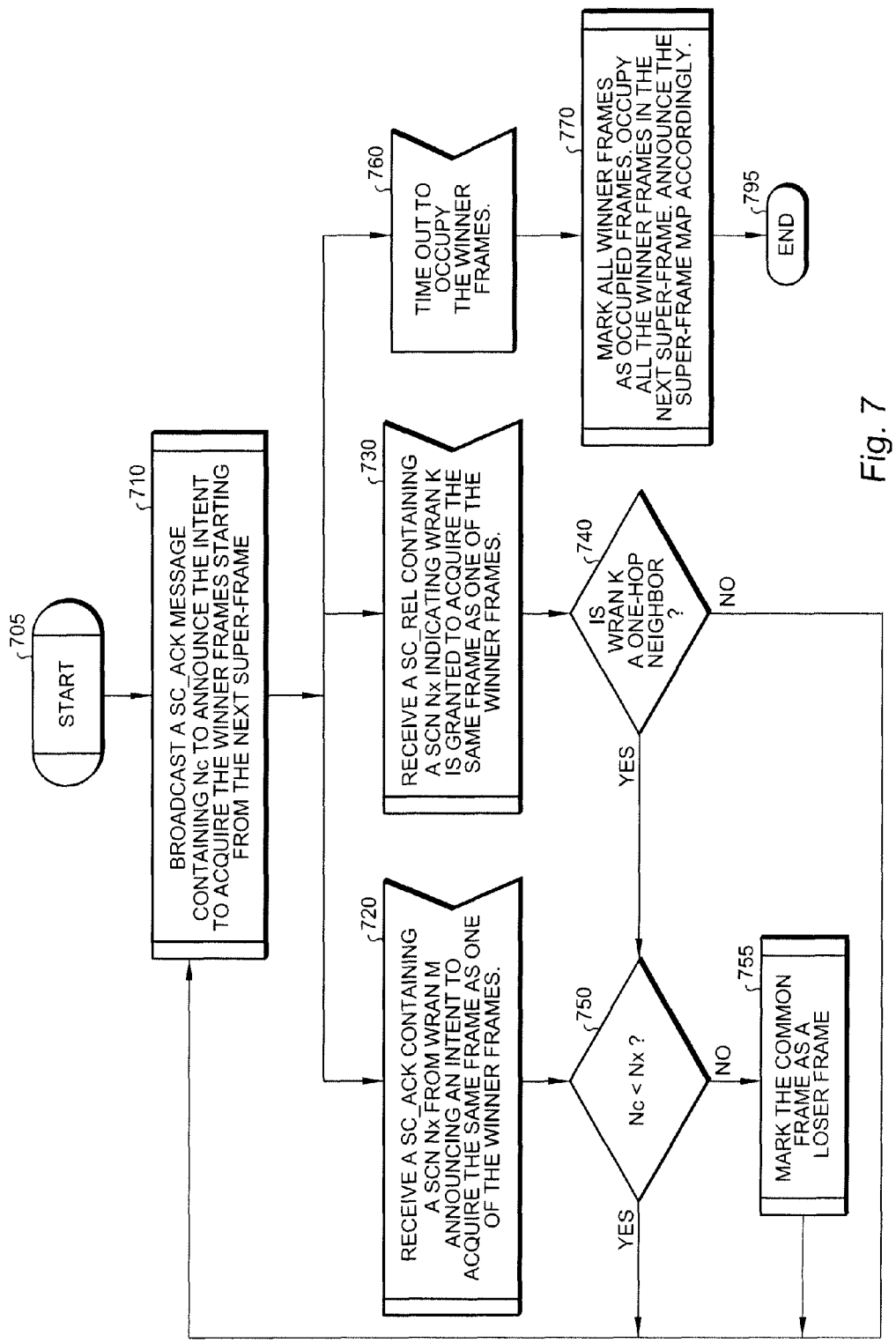
FIG. 7 is a flowchart of one embodiment of the present invention for frame acquisition in a frame-based, on-demand spectrum contention environment.

FIG. 7 is a flowchart of one embodiment of the present invention for frame acquisition in a frame-based, on-demand spectrum contention environment. The flowchart depicted in FIG. 7 begins 705 upon initiation of the frame acquisition procedure introduced in FIG. 6 625 and FIG. 8 890. With a list of available frames in hand, the WRAN cell seeking additional data frames, $WRAN_C$, broadcasts 710 a message, SC-ACK, containing a spectrum contention number $N_c$ announcing its intent to acquire the winner frames beginning upon commencement of the next superframe.

In response to broadcasting such an acknowledgement message one of three scenarios can occur. First, no other messages are received during the sensing period meaning that no contention for the winning frames will occur. Second, the broadcasting WRAN cell, $WRAN_C$, can receive a release message having another spectrum contention number indicating that another WRAN cell, $WRAN_K$, has been granted access to, and control of, the same frame. And third, another acknowledgement message can be received from another WRAN cell, $WRAN_M$, announcing that it too is attempting to acquire the same data frame. Each of these scenarios is described below in detail.

If, during the sensing period, the broadcasting $WRAN_C$ cell receives another spectrum contention acknowledgement message, SC-ACK 720 from $WRAN_X$, the cells must determine which cell has priority to the data frame. Recall that for another WRAN cell to issue an acknowledgement message in an attempt to acquire a data frame it has similarly determined a list of available frames. Thus, this type of acknowledgment message is from a one-hop neighbor. Just as original SC-ACK message includes a spectrum contention number $N_C$, so too does the acknowledgement message from $WRAN_M$, $N_X$. To determine which WRAN cell will acquire the available data frame, a comparison 750 of the spectrum contention numbers takes place. If $N_C$ is smaller than $N_X$, $WRAN_C$ wins the contention and thereafter issues a broadcast message in the next beacon window 260 acknowledging its intent to acquire a winning frame at the beginning of the next superframe.

The losing WRAN, in this case $WRAN_M$, removes its intent to acquire the frame and is silent during the next beacon window 260. Likewise, if $WRAN_C$ lost the contention, it would no longer pursue that frame (marking it as a loser frame 755) and upon arrival of the next beacon window 260, it would remain silent and likely receive an acknowledgement message from $WRAN_M$ of its success in acquiring that frame.

One possible outcome of $WRAN_C$'s broadcast of its intention to acquire the winning frame(s) from the available frame listing is the receipt of a spectrum contention release message 730, SC-REL, from a spectrum contention destination, SC-DST. Recall that after a contention, a destination WRAN issues a release message indicating which WRAN cell is gaining control of a particular sheared spectrum resource. In this case, $WRAN_C$ after issuing its broadcast acknowledgement message of intent to acquire one or more available frames in a particular superframe structure, may receive a spectrum contention release, SC-REL, indicating that $WRAN_K$ has been granted the right to acquire the same frame as is being sought after by $WRAN_C$. Included in the SC-REL message is the spectrum contention number, $N_X$, generated by $WRAN_K$. (note: $WRAN_M$ and $WRAN_K$ can be the same WRAN)

Recall that the destination cell releasing a shared spectrum resource, a frame, is a one-hop neighbor of $WRAN_C$. However, the cell to which the spectrum contention destination is releasing the frame may or may not be a one-hop neighbor of $WRAN_C$. And, if the cell gaining control of the sought after frame is not a one-hop neighbor, the frame from $WRAN_C$'s perspective, is still available for use.

Accordingly, the next step in one embodiment of the procedure for frame acquisition, as shown in FIG. 7, is to determine if $WRAN_K$ is a one-hop neighbor of $WRAN_C$ 740. When it is determined that $WRAN_C$ and $WRAN_K$ are not one-hop neighbors, another message is broadcast, this time without likely receipt of a SC-REL message indicating that another WRAN has been granted control of the same frame.

When the inquiry 740 determines that $WRAN_C$ and $WRAN_K$ are one-hop neighbors, a comparison of each cell's spectrum contention number is warranted. $N_C$ and $N_X$ are compared 750, in one embodiment of the present invention, with the smaller spectrum contention number winning. When the result is such that $N_C$ is smaller than $N_X$, the process recognizes a victory and another acknowledgement message is broadcast. And, when it turns out that $N_X$ is smaller than $N_C$, $WRAN_C$ accepts the failure and can consider whether the initiation of another contention at a later time is warranted. One of reasonable skill in the art will understand that $N_X$ of $WRAN_M$ is distinct from $N_X$ of $WRAN_K$.

FIG. 7 shows that the last option, post issuing a broadcast acknowledgment message announcing intent to acquire a particular shared spectrum resource, is silence. It is possible that after the SC-ACK message is issued, no other acknowledgments, SC-ACK, or other releases, SC-REL, are received. Upon expiration of a predetermined time out period 760 the WRAN seeking control of a particular winning frame, in this example $WRAN_C$, can mark the winning frame(s) as occupied 770. Once marked, the frames are occupied in the upcoming superframe for data transport and remain occupied until a new contention is received 795. The superframe MAP is modified and announced accordingly.

According to one or more embodiments of the present invention, a spectrum resource contention is a dispute over the control of a shared spectrum resource. While a spectrum resource can be expansively defined, it can, in one embodiment of the present invention, comprise one or more data frames. The resolution of a dispute as to which WRAN cell will control and occupy a particular data frame or similar shared spectrum resource is fundamental to a frame-based, on-demand spectrum contention protocol.

Figure 8:
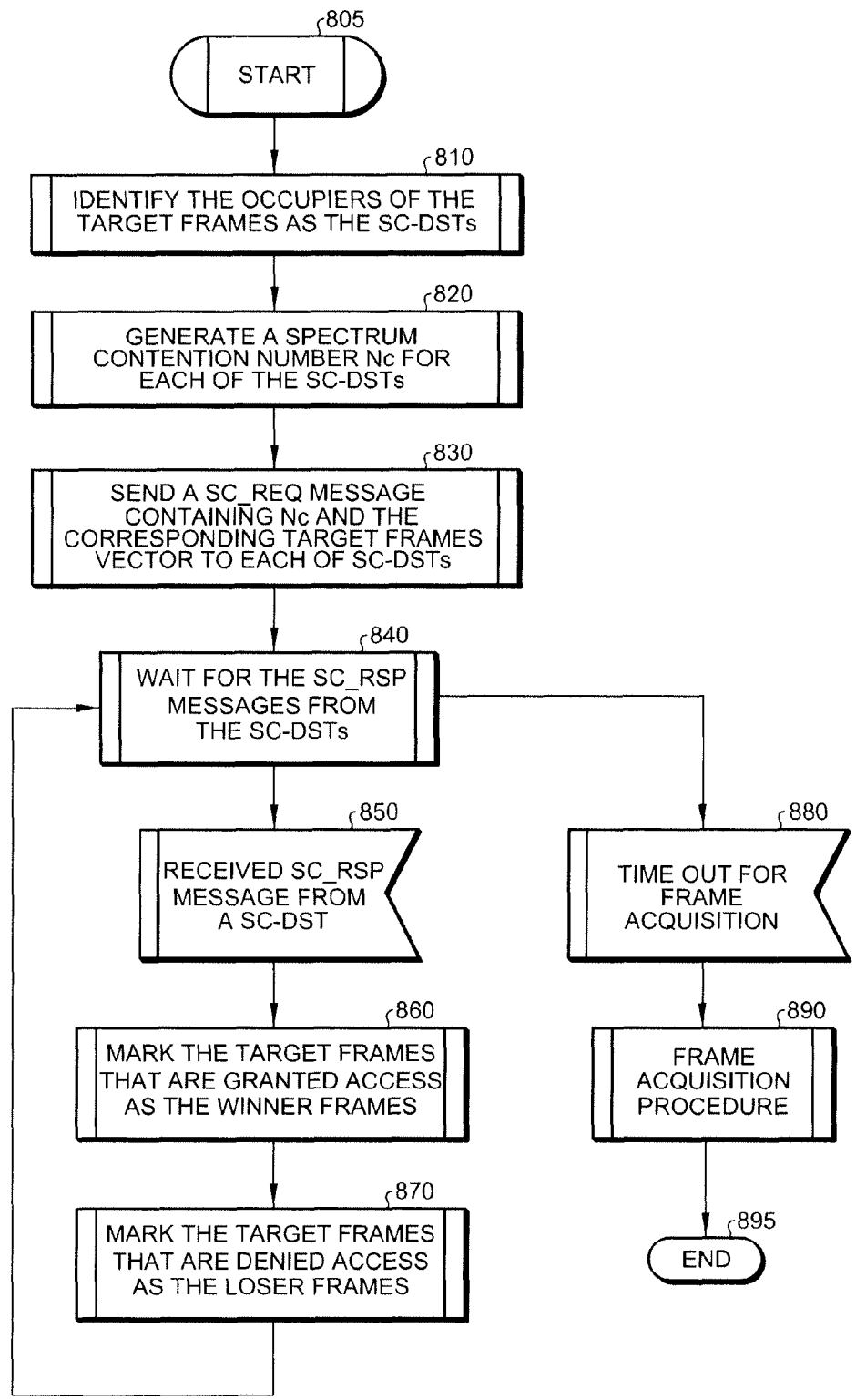
FIG. 8 is a flowchart of a procedure for a frame-based, on-demand source spectrum contention (as executed by a spectrum contention source) according to one embodiment of the present invention.

An exemplary depiction of a shared spectrum contention from the spectrum contention source's perspective is depicted in the flowchart of FIG. 8. According to one embodiment of the present invention, a contention begins 805 with identifying 810 the occupiers of targeted frames. (reference block 580 of FIG. 5) By definition the WRAN cell that occupies a frame (shared spectrum resource) is a spectrum contention destination. The "destination" designation is derived from its role as the destination of one or more contention requests for access to the frame which is under its control.

Once a WRAN cell, $WRAN_C$, has identified which of its neighbors is/are occupying a sought after data frame(s) a spectrum contention number, $N_C$, is generated 820. A separate spectrum contention number is generated for each destination in which a contention is contemplated. In other embodiments of the present invention, a spectrum contention number NC could be generated for each frame under contention. By generating a spectrum contention number for each destination, the conveyance of information necessary to conduct the contention is minimized.

With a spectrum contention number in hand, the WRAN cell, acting as a source of a contention, SC-SRC, issues a spectrum contention request 830, SC-REQ, message to each of the targeted destination(s) with targeted frames occupied by that destination marked in the vector. Included in the SC-REQ is the newly generated spectrum contention number, $N_C$. As previously discussed, the resolution of a spectrum contention occurs at the destination WRAN. Consequently, once the SC-REQ has been issued, the issuing WRAN, in this example $WRAN_C$, waits until a response message, SC-RSP, is received 840 from each of the destinations to which a SC-REQ has been directed (reference FIG. 9). Note that while this and other examples herein are described in singular context, a request for additional data frames and a subsequent contention procedure can occur for multiple frames within the same superframe and among multiple channels, simultaneously. Indeed a WRAN may easily occupy multiple roles of being both a spectrum contention destination and source with respect to different frames on the same or different channels at the same time.

A spectrum contention continues upon receipt of a response message from a destination WRAN cell 850. The SC-RSP will provide the source of the contention request with the results of the contention. If the requesting WRAN cell, the SC-SRC, possesses a winning spectrum contention number, then the response will indicate that it has won the contention. Alternatively, if the requesting WRAN cell's spectrum contention number was insufficient to secure a victory, the response message will indicate that another WRAN cell, possibly the destination WRAN cell, is the victor.

Upon receipt of the response message the frames in which victory was secured are marked 860 as winner frames. Thus, consider a situation in which a requesting WRAN is seeking access to three data frames all controlled by another one-hop neighbor WRAN cell. The three frames, having been identified as being occupied, are the focus of a spectrum contention request which includes, in one embodiment of the present invention, a unique spectrum contention number for each frame. Upon receiving the request, the destination conducts a comparison of the received spectrum contention numbers and its internally generated spectrum contention numbers (assuming that the destination cell desires to remain in control of the frames under contention) as well as any other contention numbers for other participating cells. It is possible that of the three data frames sought by the source WRAN cell, only one or two of the contentions will be successful. In these successful cases, the targeted frames are marked 860 as being winner frames. The denied frame(s) are accordingly marked as loser frames 870.

Once the frames are marked, another sensing period is undertaken to determine whether additional response messages have been issued 840. At the end of a predetermined period of time, a time out period for frame acquisition 880, the WRAN cell moves to acquire 890 control and access to the winner data frames (explained in detail with reference to FIG. 7). Upon acquisition, and thus use for data transfer, the contention process ends 895 (returning the process to 595 of FIG. 5 and thus 360 of FIG. 3).

Figure 9A:
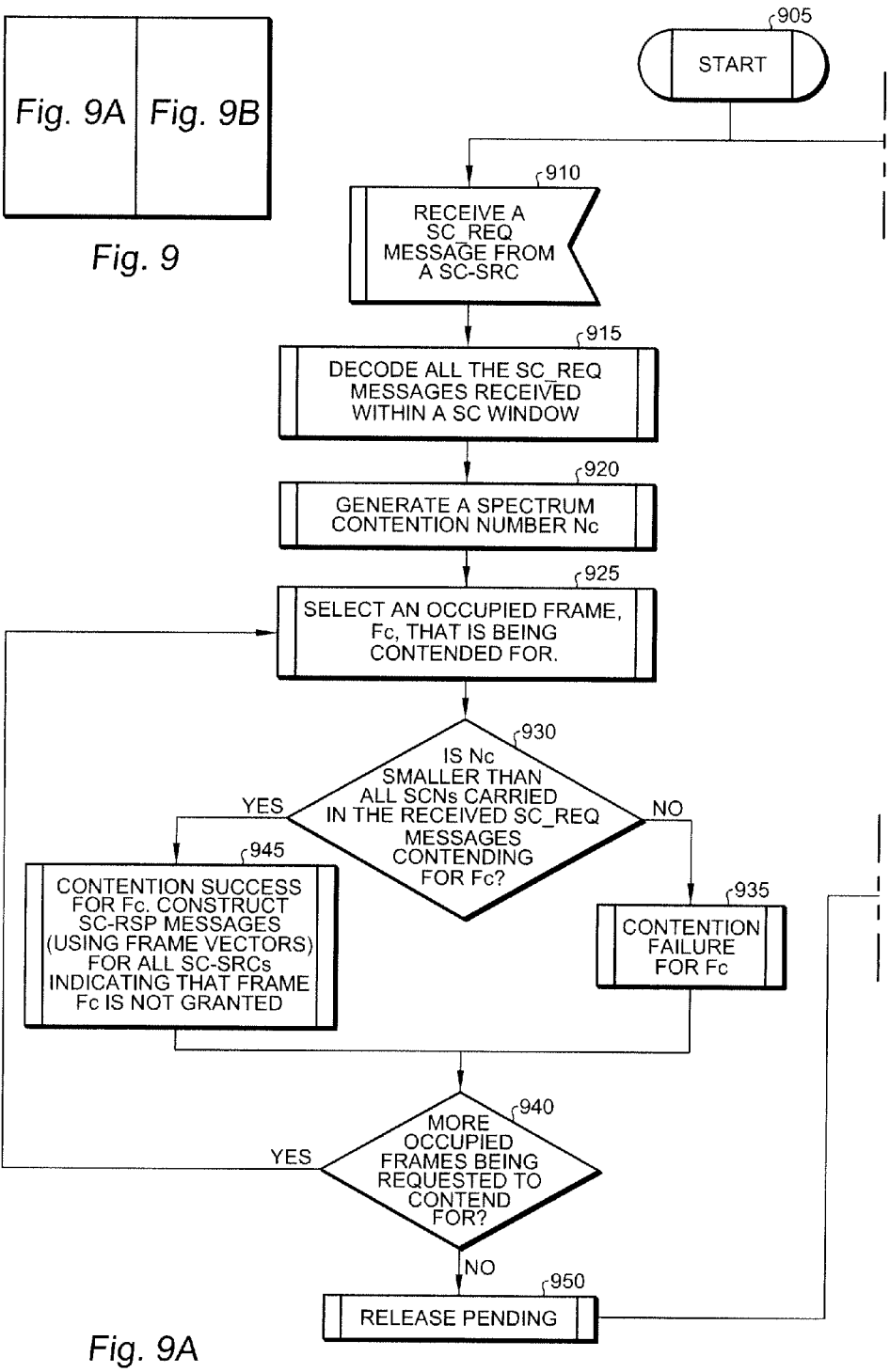
FIG. 9 is a flowchart of a procedure for a frame-based, on-demand destination spectrum contention (as executed by a spectrum contention destination) according to one embodiment of the present invention.
Figure 9B:
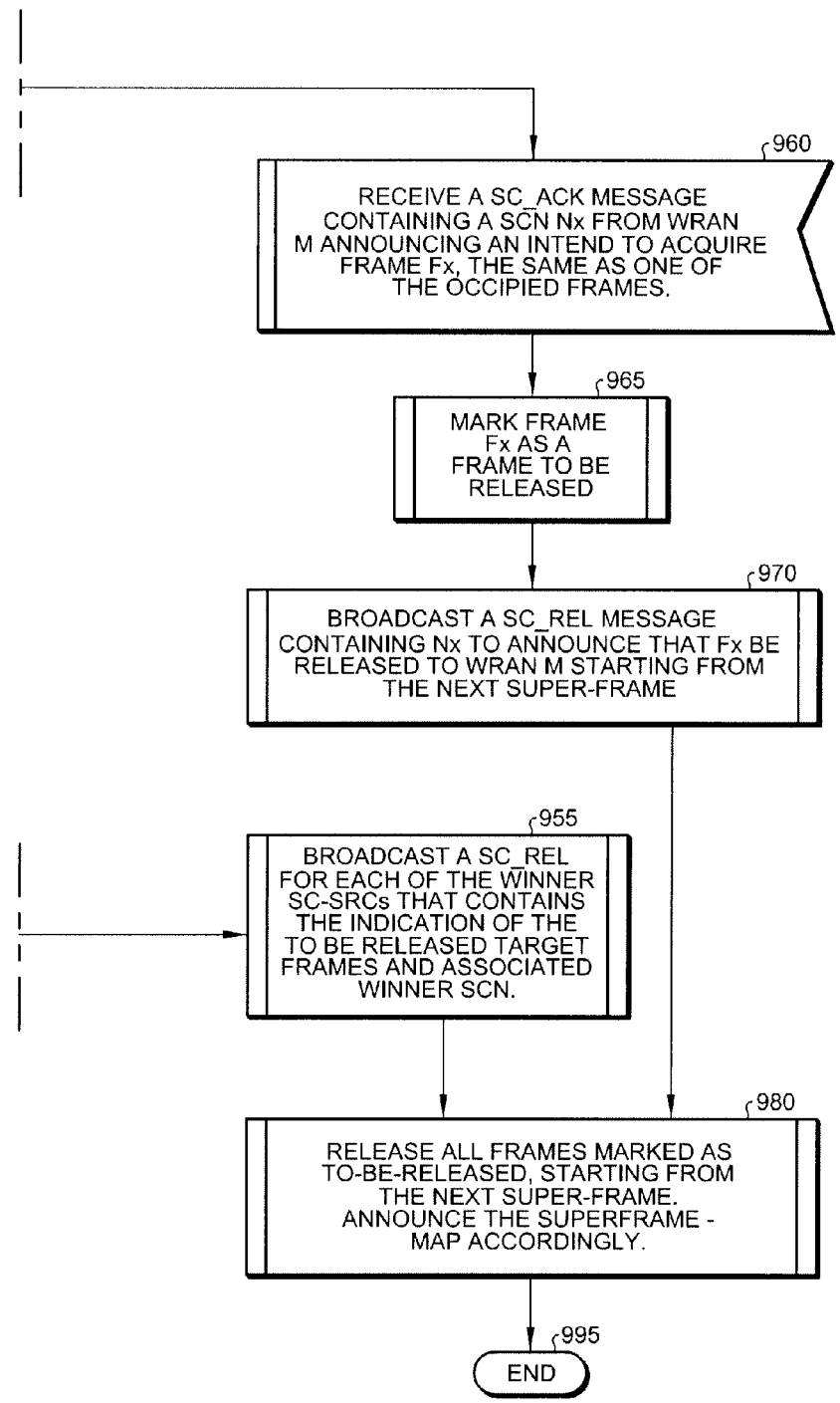

FIG. 9 is a flowchart of a procedure for a destination based frame-based, on-demand spectrum contention according to one embodiment of the present invention (reference block 520 of FIG. 5). Resolution of a contention takes place at the WRAN cell which currently controls and occupies the targeted shared spectrum resources. As discussed, such a cell is designated as the destination of the contention.

From a spectrum contention destination cell's perspective, a contention begins 905 with either the receipt of a spectrum contention request 910 or a spectrum contention acknowledgement 960.

Upon receiving 910 one or more spectrum contention request messages during a spectrum contention window from one or more spectrum contention source WRAN cells, the messages are decoded 915 to identify individual WRAN cells and their respective spectrum contention numbers. Having in its possession the spectrum contention numbers from other source spectrum contention cells, the spectrum contention destination generates its own spectrum contention number, $N_C$ 920.

As previously discussed a contention may involve more than one frame within the superframe structure. According to one embodiment of the present invention, the spectrum contention destination process selects 925 an occupied frame, $F_C$, that is being contended for by one or more source cells. (Note that the multiple frames $F_C$ can be occupied by the same destination WRAN) As previously described, each spectrum contention request includes its own spectrum contention number associated with each WRAN cell. In one embodiment of the present invention a WRAN cell SRC seeking two targeted frames, $F_1$ and $F_2$, would only issue on NC. In another embodiment of the present invention, a spectrum contention number can be associated with each frame $F_C$. The comparison 930 is thereafter conducted for the targeted frames, $F_C$, between the spectrum contention number, $N_C$, of the spectrum contention destination and the spectrum contention numbers, $N_X$, of the source cells.

When the spectrum contention number, $N_C$, is smaller than all spectrum contention numbers, $N_X$, carried in all the spectrum contention request messages for the contended frame, $F_C$, a contention success (the destination's perspective) for those particular data frames is declared 945. When a success is declared for the destination, a SC_RSP message is constructed using a frame vector issued to each SC_SRC indicating that $F_C$ is not granted. And, alternatively, when the spectrum contention number, $N_C$, is larger than all spectrum contention numbers, $N_X$, carried in the spectrum contention request messages for the contended frame, $F_C$, a failure is declared 935 (reference block 1005 of FIG. 10). Frames in which a spectrum contention failure has been declared are marked as "to-be-released" once an acknowledgment has been received from the winning WRAN (see below).

A comparison of the spectrum contention numbers, $N_X$, received from each spectrum contention request, SC-REQ, and the spectrum contention number, $N_C$, generated by the spectrum contention destination, is conducted for each occupied frame that is in contention 940. Upon the resolution of contention for each occupied frame identified by the received spectrum contention request messages, a release is pending 950 (reference block 1105 of FIG. 11). For the frames in which a contention failure has been identified the release message would indicate that the winning spectrum contention source has gained control of the designated frame. And, in the situation wherein the spectrum contention destination was victorious in the contention, the release message would indicate that control of the applicable frame would remain with the spectrum contention destination. With the release pending 950 a release message is generated 955 containing the winning spectrum contention number announcing to the winning WRAN cell that $F_C$ is released at the start of the next superframe.

The other possible initiation of a shared spectrum contention is upon receipt 960 of a spectrum contention acknowledgment message, SC-ACK, containing a spectrum contention number, $N_X$, from a neighboring $WRAN_M$ cell announcing its intent to acquire a frame which is currently occupied by the destination. For example, with additional reference to FIG. 2, a contention process between Network 1 210 and Network 2 220 can result in Network 2 220 issuing an acknowledgement message to Network 3 230. It is this additional acknowledgement message between Network 2 220 and Network 3 230 from the contention between Network 1 210 and Network 2 220 that is the subject of SC_ACK message of FIG. 9 960. Upon receipt of such an acknowledgment message, the frame under contention, $F_X$, is marked as a frame to be released 965. Recall that a spectrum contention acknowledgment message is generated upon the determination that a frame is available. Thus, upon receipt of a spectrum contention acknowledgment message, no contention is required.

Accordingly, once the frame, $F_X$, has been marked to be released 965, a spectrum contention release message is broadcast to announce that the frame, $F_X$, will be released 970 to $WRAN_M$ starting from the next superframe.

Upon expiration of a predetermined period of time, all frames marked as "to-be-released" starting from the next superframe are released 980 at the beginning of the next superframe. The process thereafter ends 995 (reference block 595 of FIG. 5). A corresponding spectrum contention response message is constructed by the destination using frame vectors for all spectrum contention sources in which the contention was not successful and access to the targeted frame was not gained.

Figure 10:
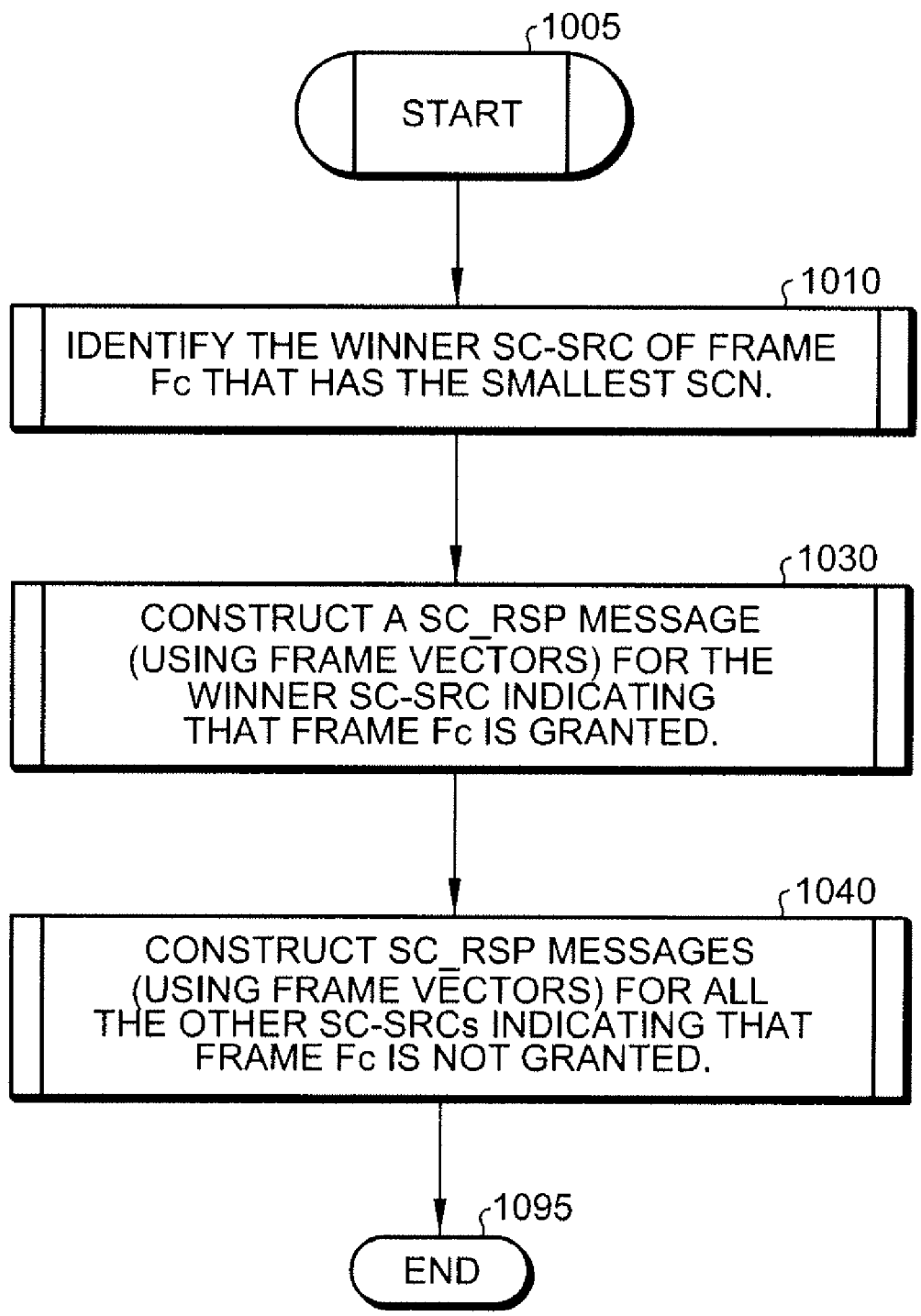
FIG. 10 is a high level flowchart of message generation at a spectrum contention destination involving multiple frames and multiple spectrum contention sources, according to one embodiment of the present invention.

FIG. 10 is a high level flowchart of a spectrum contention failure for a data frame at a spectrum contention destination involving multiple frames, according to one embodiment of the present invention (reference block 935 of FIG. 9). Recall that a spectrum contention destination may be in control of more than one frame of a 16 frame superframe structure. Upon receipt of a spectrum contention request, the above-described contention process is undertaken to determine whether occupancy of the frame will remain with the destination or whether the frame will be released.

Upon determination that, from the destination's perspective, the contention for a frame has failed, a process is begun 1005 to identify 1010 the winning spectrum contention source for each frame. Recall that in the previous method the destination simply determined that in comparison with the received spectrum contention numbers, its own internally generated spectrum contention number was insufficient to maintain control and occupancy of the targeted spectrum resource. Thereafter, and according to one embodiment of the present invention, a determination is made to identify 1010 which spectrum contention source for a particular frame, $F_C$, is associated with the winning spectrum contention number.

Once the winning spectrum contention source has been identified for each frame $F_C$, a spectrum contention response message is constructed 1030 using frame vectors to the winning spectrum contention source informing it of its victory. Likewise, for all remaining spectrum contention sources in which the attempt to gain access to frame $F_C$ was a failure, a spectrum contention response message is constructed 1040 by the destination (again using frame vectors) informing the spectrum contention sources that the attempt to gain access to frame $F_C$ has failed.

Figure 11:
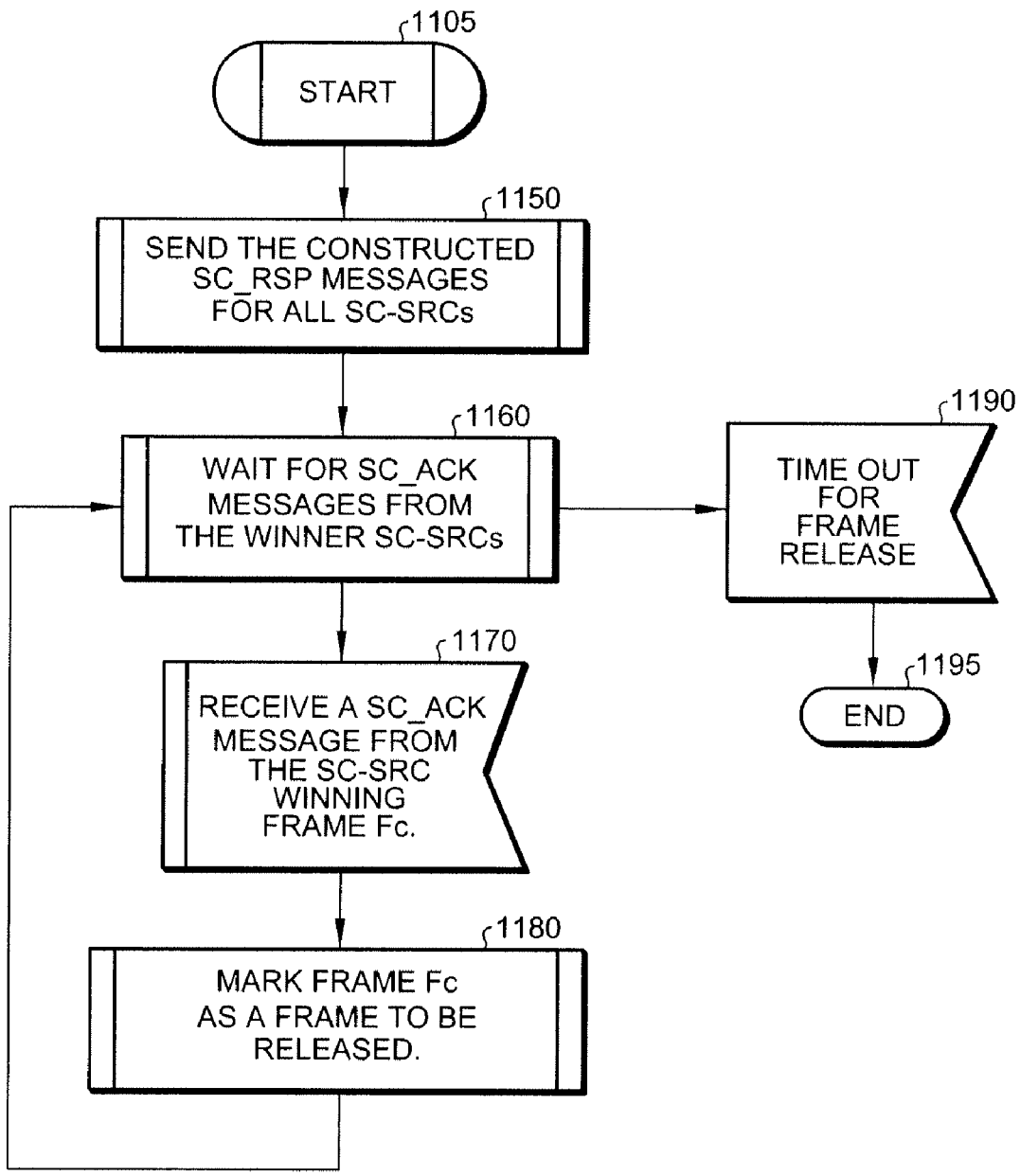
FIG. 11 is a high level flowchart of the release of pending operations at a contention destination, according to one embodiment of the present invention.

FIG. 11 is a high level flowchart of the release of pending operations at a contention destination, according to one embodiment of the present invention. Upon construction of the success and failure spectrum contention response messages, the messages are sent 1150 to the appropriate source WRAN cells by the destination. After the spectrum contention response, SC-RSP, message is sent, the destination waits 1160 a predetermined period of time for a spectrum contention acknowledgment from each source. When an acknowledgment message, SC-ACK, is received 1170 from the winning spectrum contention source WRAN the frame, $F_C$, is marked as "to-be-released" 1180. The process iteratively continues, waiting for additional SC_ACK messages 1160, until a time out period is obtained 1190 ending the process 1195.

As shown above, a WRAN cell, acting as a spectrum contention destination or a spectrum contention source, can effectively and efficiently manage, gain and release shared spectrum resources on a frame-by-frame basis over the superframe structure. Thus, according to one embodiment of the present invention, data frames of any superframe of a spectrum resource can be reallocated on a frame-by-frame basis beginning with each superframe as the needs of the WRAN cells within a cognitive radio communication network vary.

One of reasonable skill in the relevant art will appreciate that a reliable and efficient inter-network communication mechanism for coexistence is necessary for WRAN cells to effectively execute a frame-based, on-demand spectrum contention protocol. One means by which to establish inter-network communication is via the beacon window following each data frame. Other communication mechanisms are possible and may be modified to align with the teachings and spirit of the present invention. With the synchronization of the frame/superframe structure between inter-network WRAN cells a fine grain spectrum sharing is achievable.

As discussed above, inter-network communication can occur, according to one embodiment of the present invention, via spectrum contention messaging such as request, response, acknowledgement and release messages. The messages are transmitted in the payload of a contention beacon period packet.

According to one embodiment of the present invention, a spectrum contention request message, SC-REQ, can be of the following format.

| Syntax | Size | Notes |
| --- | --- | --- |
| SC_REQ_IE_Format( ) { | | |
| Element ID | 8 bits | Indication of the Message Type |
| Length | 8 bits | |
| BS ID of Contention Source | 48 bits | The MAC address of the contention source's base station. |
| BS ID of Contention Destination | 48 bits | The MAC address of the contention destination's base station. |
| Sequence number | 8 bits | Incremented by 1 by the source whenever any of the following three fields change. The contention destinations shall discard the repeated SC_REQ IEs. |

-continued

| Syntax | Size | Notes |
|---|---|---|
| Spectrum Contention Number (SCN) | 16 bits | A random number to show the priority to contend for spectrum resource of the target TV channel. |
| TV Channel number | 8 bits | The TV channel being requested by the contention source |
| Contention Request Frame Index Vector | 16 bits | A bit vector indicating the indexes of data frames within a superframe that the Contention Source WRAN requests to acquire (through the contention) for its data services starting from the next superframe.<br>For each of the 16 bits as shown below, the corresponding frame is requested for the contention when a bit's value is set to 1. Otherwise, the bit value of the corresponding frame is set to 0.<br>Bit 0: Frame 0;<br>Bit 1: Frame 1;<br>Bit 2: Frame 2;<br>Bit 3: Frame 3;<br>Bit 4: Frame 4;<br>Bit 5: Frame 5;<br>Bit 6: Frame 6;<br>Bit 7: Frame 7;<br>Bit 8: Frame 8;<br>Bit 9: Frame 9;<br>Bit 10: Frame 10;<br>Bit 11: Frame 11;<br>Bit 12: Frame 12;<br>Bit 13: Frame 13;<br>Bit 14: Frame 14;<br>Bit 15: Frame 15. |
| } | | |

A spectrum contention response message, SC-RSP, is sent to inform a contention source whether a request for a targeted spectrum resource (frame) was successful. As discussed herein, such a message is transmitted from a destination WRAN after it has received a spectrum contention request message. A spectrum contention response message can be, according to one embodiment of the present invention, of the following format.

| Syntax | Size | Notes |
|---|---|---|
| SC_RSP_IE_Format( ) { | | |
|   Element ID | 8 bits | Indication of the Message Type |
|   Length | 8 bits | |
|   BS ID of the Contention Source | 48 bits | Copy from the corresponding CC_REQ IE received |
|   BS ID of the Contention Destination | 48 bits | MAC address of the Spectrum Contention Destination BS. |
|   Sequence number | 8 bits | Copy from the CC_REQ. |
|   TV Channel number | 8 bits | The TV channel requested by the Contention Source BS |
|   Contention Response Frame Index Vector | 16 bits | A bit vector indicating the contention results determined by the channel contention algorithm for the data frames within a superframe that the contention source WRAN requests to acquire. These contention results will be effective starting from the next superframe.<br>For each of the 16 bits as shown below, the corresponding frame is granted to the contention source when a bit's value is set to 1. Otherwise, the frame is not granted. For a data frame that is not requested by any contention source, the corresponding bit is set to 0.<br>Bit 0: Frame 0;<br>Bit 1: Frame 1;<br>Bit 2: Frame 2;<br>Bit 3: Frame 3;<br>Bit 4: Frame 4;<br>Bit 5: Frame 5; |

| Syntax | Size | Notes |
|---|---|---|
| | | Bit 6: Frame 6; |
| | | Bit 7: Frame 7; |
| | | Bit 8: Frame 8; |
| | | Bit 9: Frame 9; |
| | | Bit 10: Frame 10; |
| | | Bit 11: Frame 11; |
| | | Bit 12: Frame 12; |
| | | Bit 13: Frame 13; |
| | | Bit 14: Frame 14; |
| | | Bit 15: Frame 15. |
| } | | |

The spectrum contention acknowledgement message of the present invention is typically sent in a contention beacon period burst payload by the contention source. It is used to notify contention destinations that the contention source will occupy the destination's working shared spectrum or give up a request to do so. For example, a contention source will typically notify a contention destination that it will occupy a shared spectrum resource when it receives a response message with a contention success indication from all of the contention destinations. Otherwise, the contention source will notify the contention destinations that it will relinquish control of the shared spectrum resource if it receives a response message with a rejection indication from any of the contention destinations. According to one embodiment, the format of an acknowledgment message is the following.

| Syntax | Size | Notes |
|---|---|---|
| SC_ACK_IE_Format( ) { | | |
| Element ID | 8 bits | |
| Length | 8 bits | |
| Source Id | 48 bits | The MAC address of the contention source |
| Destination (Broadcast) Id | 48 bits | The MAC address of Message Broadcast |
| Sequence number | 8 bits | Same as the corresponding SC_REQ IE. The contention destinations shall discard the repeated CC_ACK IE being received |
| TV Channel number | 8 bits | The TV channel being requested by the contention source |
| Contention Acknowledgement Frame Index Vector | 16 bits | A bit vector indicating the contention results determined by the channel contention algorithm for the data frames within a superframe that the contention source WRAN will acquire starting from the next superframe. For each of the 16 bits as shown below, the corresponding frame will be occupied by the contention source when a bit's value is set to 1. Otherwise, the frame will not be occupied.<br>Bit 0: Frame 0;<br>Bit 1: Frame 1;<br>Bit 2: Frame 2;<br>Bit 3: Frame 3;<br>Bit 4: Frame 4;<br>Bit 5: Frame 5;<br>Bit 6: Frame 6;<br>Bit 7: Frame 7;<br>Bit 8: Frame 8;<br>Bit 9: Frame 9;<br>Bit 10: Frame 10;<br>Bit 11 Frame 11;<br>Bit 12: Frame 12;<br>Bit 13: Frame 13;<br>Bit 14: Frame 14;<br>Bit 15: Frame 15. |
| Spectrum Contention Number (SCN) | 16 bits | The winning SCN used in SC_REQ message, showing the priority to contend for spectrum resource of the target TV channel. |
| BS ID of the granting SC-DST | 48 bits | The ID of the SC-DST WRAN cell granting the access to the data frame that are being acquired by the winning SC-SRC (this is used to enable "clear to send"). |
| } | | |

And, similarly, a spectrum contention release message is typically a broadcast type of message transmitted by the spectrum contention destination which has granted access to a particular shared spectrum resource announcing the resource's release. A typical release message, according to one embodiment of the present invention, can be of the following format.

invention multiple coexistence scenarios were conducted using performance evaluation and tools.

Using the NS2 model network simulator under IEEE 802.22, a performance evaluation of the protocols of the present invention were conducted. The simulation parameters included sharing a single channel in which each superframe is comprised of 16 frames. Each frame within the superframe is

| Syntax | Size | Notes |
| --- | --- | --- |
| SC_REL_IE_Format( ) { | | |
|   Element ID | 8 bits | |
|   Length | 8 bits | |
|   Source Id | 48 bits | The MAC address of the contention destination BS. |
|   Destination (Broadcast) Id | 48 bits | The MAC address of Message Broadcast |
|   Sequence number | 8 bits | Same as the corresponding CC_REQ IE. The contention destinations shall discard the repeated SC_REL IE being received |
|   TV Channel number | 8 bits | The TV channel being requested by the contention source |
|   Contention Release Frame Index Vector | 16 bits | A bit vector indicating the contention results determined by the channel contention algorithm for the data frames within a superframe that the contention source WRAN will acquire starting from the next superframe. For each of the 16 bits as shown below, the corresponding frame will be occupied by the contention source when a bit's value is set to 1. Otherwise, the frame will not be occupied. Bit 0: Frame 0; Bit 1: Frame 1; Bit 2: Frame 2; Bit 3: Frame 3; Bit 4: Frame 4; Bit 5: Frame 5; Bit 6: Frame 6; Bit 7: Frame 7; Bit 8: Frame 8; Bit 9: Frame 9; Bit 10: Frame 10; Bit 11 Frame 11; Bit 12: Frame 12; Bit 13: Frame 13; Bit 14: Frame 14; Bit 15: Frame 15. |
|   Spectrum Contention Number (SCN) | 16 bits | The winning SCN used in SC-REQ message, showing the priority to contend for spectrum resource of the target TV channel. |
|   BS ID of the winning SC-SRC | 48 bits | The ID of the the SC-SRC WRAN cell granted the access to the data frame that are being released by the granting SC-DST (this is used to enable efficient spectrum reuse). |
| } | | |

The frame-based, on-demand spectrum contention protocol of the present invention provides an efficient, scalable, and fair internetwork spectrum sharing system. The protocols of the present invention provide simple contention processes using a random number exchange. Contentions are conducted in parallel with ongoing data transmissions. Thus, there is no interruption in data communications. Collisions are avoided and there are no hidden node problems. The protocols of the present invention are scalable in that the decision-making process is distributed with no central arbitrators needed. The process is stable providing cooperation among the networks achieving a needed goal of fairness and efficiency in spectrum sharing.

The frame-based, on-demand spectrum contention protocol presented herein is also fair. By using a random number comparison and an on-demand iterative contention process, the allocation of shared network resources are equitably distributed. To verify the equity of the protocols of the present 10 ms in length and the self-coexistence window is 1 ms. The simulations were conducted over a 10,000 second period of time.

Figure 12:
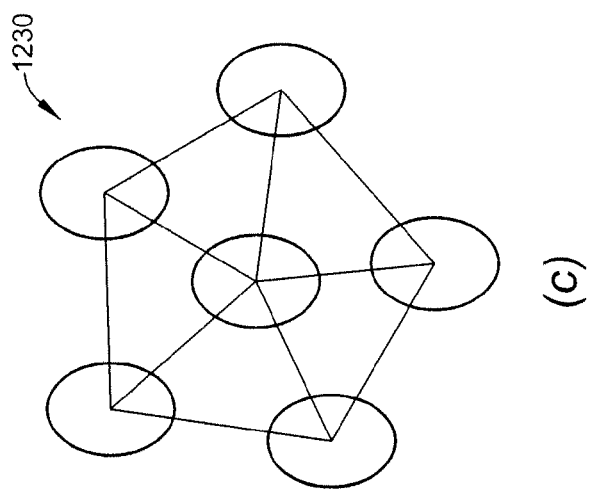
FIG. 12 is a graphical depiction of three overlapping WRAN networks and their respective communication paths used for evaluation of a frame-based, on-demand spectrum contention protocol.
Figure 12:
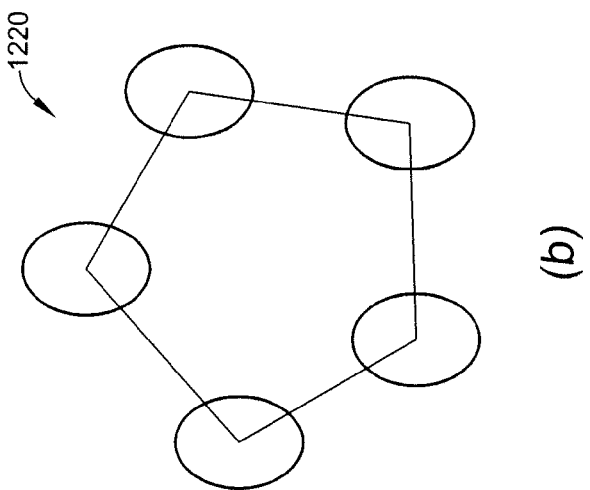
Figure 12:
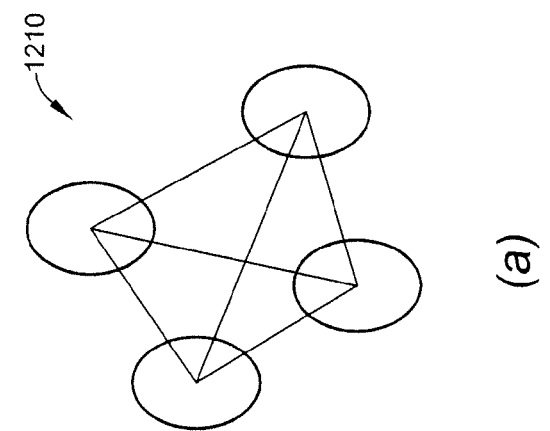

Three coexistence scenarios were examined including a complete graph scenario, a cycle graph scenario and a wheel graph scenario. FIG. 12 shows a graphical representation of various coexistence scenarios used in the simulation evaluation. Each graphical depiction identifies a plurality of the stations or WRAN cells and their respective communication paths.

The first coexistence scenario examined under the simulation conditions described above was a complete graph scenario comprised of four base stations. As shown in FIG. 12a 1210 each of the four base stations can communicate with the other three base stations in the complete graph scenario. Thus, the scenario represents a situation where the WRAN cells of each station overlap. The result of the simulation, shown in the table below, identify the fairness of the frame-based, on-demand spectrum contention protocol of the present invention. For example, theoretically, a perfectly fair sharing of a spectrum resource between two cells would result in a 0.5 usage of the spectrum for each cell. As shown in the table below, the present invention identifies that in a two cell scenario the first cell gained access to the shared spectrum 0.500884 times as compared to sell two which had access to the shared spectrum of 0.494989. And as shown in the last column, it took 30 seconds to achieve convergence of this equality.

The remaining entries in the table indicates scenarios of 3, 4, and 5 cell networks. Again, for example, and in correspondence with the depiction of a complete graph scenario shown in FIG. 12a 1210, a four cell complete graph scenario experienced convergence within 270 seconds. Each of the four cells achieved approximately ¼ of the total access to the shared spectrum. The entries under cell 1, cell 2, cell 3 and cell 4 represent the actual access to the shared spectrum for each of the representative cells. Thus, after 270 seconds, with respect to the total access to the shared spectrum, cell 1 achieved a 0.248409 portion, cell 2 achieved a 0.251128 portion, cell 3 achieved a 0.251106 portion and cell 4 achieved a 0.246233 portion.

TABLE 1

Complete Graph Scenario

| No. of Cells | Cell 1 | Cell 2 | Cell 3 | Cell 4 | Cell 5 | Optimal | Convergence Time(s) |
|---|---|---|---|---|---|---|---|
| 2 | 0.500884 | 0.494989 | | | | ½ | 30 |
| 3 | 0.331630 | 0.329914 | 0.335365 | | | ⅓ | 150 |
| 4 | 0.248409 | 0.251128 | 0.251106 | 0.246233 | | ¼ | 270 |
| 5 | 0.202269 | 0.193133 | 0.203893 | 0.198870 | 0.198137 | ⅕ | 300 |

The second performance evaluation of the present invention involved a cycle graph scenario. As shown in FIG. 12b, a cycle graph scenario is one in which a plurality of the WRAN cells overlap with the communication paths being limited. The depiction shown in FIG. 12b is of 5 overlapping WRAN cells in which any one WRAN cell overlaps with only two one-hop neighbors.

The evaluation of the cycle graph scenario shown in FIG. 12b 1220 demonstrates the convergence occurs more quickly for combinations of WRAN cells that can be grouped. For example, the convergence of three WRAN cells occurs in 150 seconds while the convergence of 6 WRAN cells occurs in 30 seconds. Correspondingly, the convergence of five WRAN cells occurs in 336 seconds. The reason for this is because six WRAN cells can be grouped into three sets of two WRAN cells and similarly four WRAN cells can be grouped into two sets of two WRAN cells. However, numbers such as five and seven WRAN cells cannot be grouped efficiently thus resulting in a higher convergence time. (See below)

TABLE 2

Cycle Graph Scenario

| No. of Cells | Cell 1 | Cell 2 | Cell 3 | Cell 4 | Cell 5 | Cell 6 | Cell 7 | Optimal | Convergence Time(s) |
|---|---|---|---|---|---|---|---|---|---|
| 3 | 0.331630 | 0.329914 | 0.335365 | | | | | ⅓ | 150 |
| 4 | 0.501248 | 0.495934 | 0.495934 | 0.500581 | | | | ½ | 32 |
| 5 | 0.420031 | 0.284119 | 0.419478 | 0.416048 | 0.4197 | | | ⅖ | 336 |
| 6 | 0.497953 | 0.498706 | 0.497822 | 0.498873 | 0.497619 | 0.4989 | | ½ | 30 |
| 7 | 0.430724 | 0.448526 | 0.428689 | 0.436894 | 0.439151 | 0.432226 | 0.348478 | 3/7 | 418 |

As with the simulation scenario involving a complete graph, a cycle graph scenario also provides equitable results. For example, in the cycle graph of 3 WRAN cells each achieves access to approximately ⅓ of the shared spectrum. As shown above, cell 1 achieves a 0.331630 portion access, cell 2 achieves a 0.329914 portion access and cell 3 achieves a 0.335365 portion access to shared spectrum. In a four cell example, access is based on a two cell grouping. Thus, for an equitable distribution of the shared spectrum any one cell should achieve approximately a 0.5 portion access to the shared spectrum. As can be seen in the results shown in the table above, each cell in a four cell scenario achieves approximately a 0.5 portion access to the shared spectrum and does so with a convergence of approximately 32 seconds. Similar equitable results can be seen for scenarios of 5, 6 and 7 WRAN cell networks.

The final scenario for the performance evaluation of a frame-based, on-demand spectrum contention protocol is that of a wheel graph scenario 1230. A wheel graph scenario is one of the plurality of WRAN cells in which each cell overlaps with and can communicate with each other cell. Again, as with the cycle graph scenario, convergence is optimized when cells can be grouped. For example a five WRAN cell scenario can be optimized by examining the convergence of groups of three WRAN cells.

Figure 13:
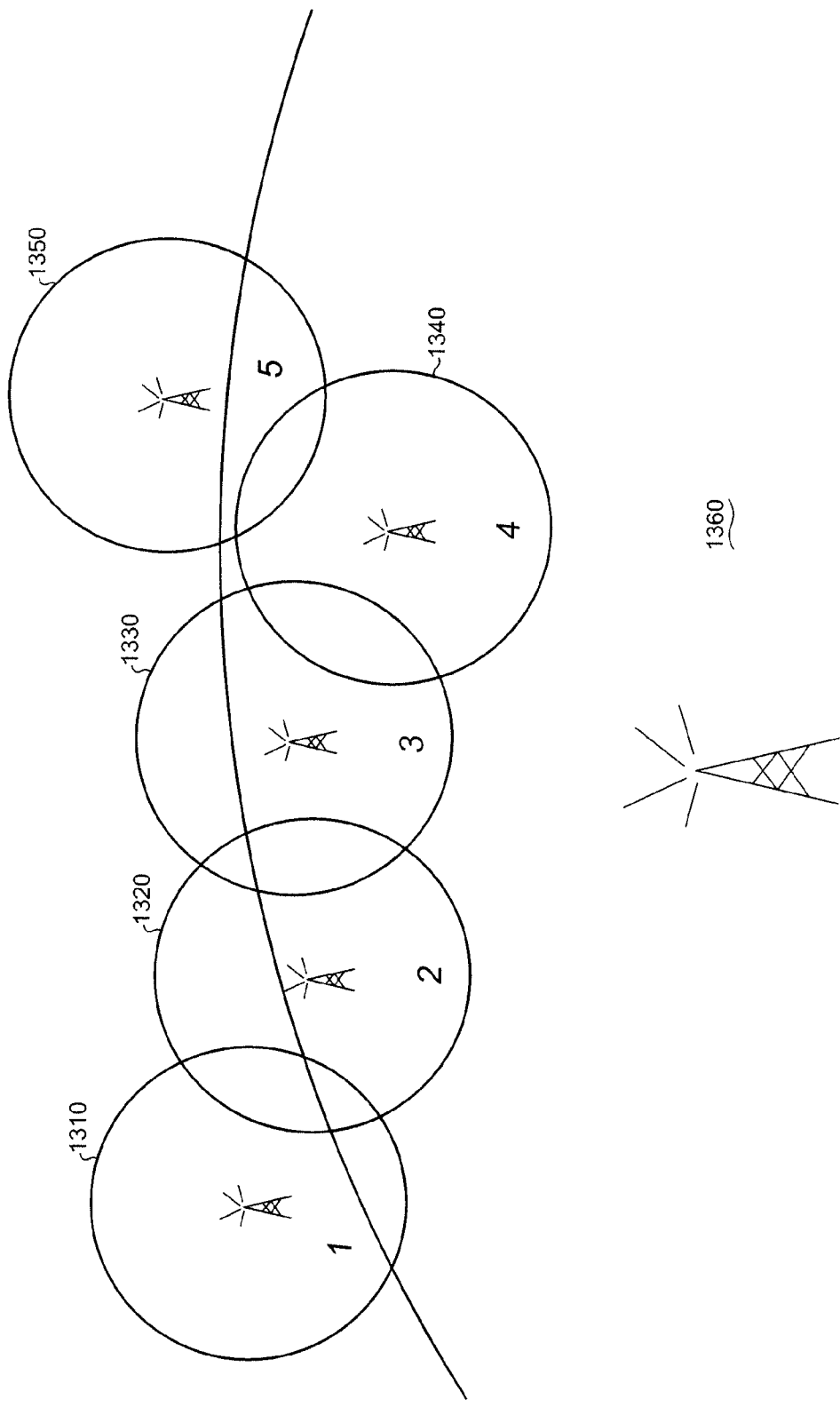
FIG. 13 is an overlapping wireless CR network configuration of a plurality of overlapping base stations implementing a frame-based, on-demand spectrum contention resolution protocol according to one embodiment of the present invention.

WRANs. As mentioned, the embodiments of the present invention described herein are scalable and are equally adept to complicate CR communication systems. FIG. 13 shows a series of five overlapping WRAN cells which are vying for control and access of a limited shared spectrum resource using one embodiment of a frame-based, on-demand spectrum contention protocol of the present invention.

To better understand the methodologies presented herein assume, as before, that a shared spectrum resource, one or more frames of a superframe, is being occupied by Network 2 1320. Further assume that all five WRANs depicted exist within the incumbent TV area 1360 and only limited portions of a single channel are available for CR use. In this example, Network 2 1320 is exclusively using available frames 2, 5 and 8 while the incumbent utilizes frames 1, 6, 7, and 9-16. Thus, WRAN 1 1310 and Network 3 1330 can, at this time, only use frames 3 or 4. If Network 3 1330 is using only frame 4, Network 4 1340 is free to use frames 2, 3, 5, and 8.

Network 1 1310 may experience an internal increase in demand (the addition of more CPE in its area of responsibility) causing it to seek additional spectrum resources. From Network 2's 1320 perspective, the internal demand on Network 1 1310 is seen as an external demand. Accordingly, Network 1 1310, seeing that there are no unoccupied frames in the shared spectrum resource, targets at least one of frames

TABLE 3

Wheel Graph Scenario

| No. of Cells | Cell 1 | Cell 2 | Cell 3 | Cell 4 | Cell 5 | Cell 6 | Cell 7 | Optimal | Convergence Time(s) |
|---|---|---|---|---|---|---|---|---|---|
| 4 | 0.248409 | 0.251128 | 0.251106 | 0.246233 | | | | ¼ | 270 |
| 5 | 0.334881 | 0.333089 | 0.32877 | 0.334587 | 0.327745 | | | ⅓ | 505 |
| 6 | 0.283983 | 0.277948 | 0.305698 | 0.278366 | 0.283266 | 0.278926 | | 2/7 | 1933 |
| 7 | 0.324517 | 0.335407 | 0.336619 | 0.330762 | 0.330051 | 0.329977 | 0.331971 | ⅓ | 1112 |

Table 3 above shows that an optimal conversion of four WRAN cells in a wheel graph scenario is approximately ¼ of the shared spectrum. Thus, each of the 4 WRAN cells should gain approximately a 0.25 portion access to the shared spectrum upon convergence. The result of the simulation above shows that after 270 seconds, cell 1 achieved a 0.248409 portion access, cell 2 achieved a 0.251128 portion access, cell 3 achieved a 0.251106 portion access and cell 4 achieved a 0.246233 portion access to shared spectrum. Similarly, in a five WRAN cell wheel graph scenario, the optimal convergence occurs by a grouping of three cells. Thus, each of the three grouped cells should achieve approximately a ⅓ portion access to the shared spectrum upon convergence. The result of the simulation shows that in a five cell wheel graph scenario, cell 1 achieved a 0.334881 portion access, cell 2 achieve a 0.333089 portion access, cell 3 achieved a 0.328770 portion access, cell 4 achieved a 0.334587 portion access and cell 5 achieved a 0.327745 portion access with a total convergence time of 505 seconds.

The present invention presents a frame-based, on-demand spectrum contention protocol which is both fair and efficient. Evaluations under a simulation tool have shown that the protocol of the present invention provides a rapid and fair allocation of a limited resource in a cognitive radio system. This allocation is on-going so as to prevent any interruption of data services and is further scalable to meet the needs of an expanding network.

The prior description has primarily used the example of three overlapping base stations in which a contention has arisen for use of a shared spectrum resources by two of three

2, 5 or 8 to meet its demand. For this example, assume Network 1 1310 is targeting frame 5.

Just as the contention protocol proceeds as previously discussed at Network 2 1320 with respect to frame 5, a concurrent contention can be taking place at Network 4 1340. Network 5 1350 may have initiated a contention for some of the shared spectrum resources controlled by Network 4 1340. For example, Network 5 may be targeting frames 4 and 5. From Network 5's 1350 perspective frame 4 is unoccupied and it can be acquired without contention.

Frame 5, however, is occupied by Network 4 1340 resulting in a contention. During the period of time governed by the length of the superframe in which the contention for frame 5 is decided by Network 2 1320, the contention for frame 5 is also determined by Network 4 1340. The superframes, during which the independent decisions are made, are synchronized. It is possible for Network 4 1340 to lose the contention thus releasing to Network 5 1350 control of frame 5 while at the same time Network 2 wins the contention retaining use of frame 5. In such a scenario, Network 3 1330 is still precluded from acquiring frame 5 even though Network 4 1340 released frame 5. Each WRAN cell must independently determine its topology of one-hop neighbors and shared spectrum resource utilization to determine which frames are available and which are not and the distribution of occupancy of the frames can change (and often does) upon determination interval (e.g. superframe). Over time, access to the shared spectrum is equitable.

In a preferred embodiment, the present invention can be implemented in software and executed on devices having a microprocessor such as a computer, cellular telephone, personal data assistant, and the like. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device in the form of a conventional computer, a personal communication device or the like, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk and a magnetic disk drive for reading from or writing to a removable magnetic disk. The hard disk drive and magnetic disk drive are connected to the system bus by a hard disk drive interface and a magnetic disk drive interface respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer, such as magnetic cassettes, flash memory cards, digital video disks, random access memories (RAMs), read-only memories (ROMs) and the like may also be used in the exemplary operating environment.

A number of program modules may be stored on the hard disk, magnetic disk, ROM or RAM, including an operating system, one or more application programs or software portions, other program modules and program data. A user may enter commands and information into the personal computer through input devices such as a keyboard and pointing device. Other input devices may include a microphone, joystick, game pad, satellite dish, scanner or the like. These and other input devices are often connected to the processing unit through a serial port interface that is coupled to the system bus, but may be connected by other interfaces, such as a parallel port, game port or universal serial bus (USB). A monitor or other type of display device may also be connected to the system bus via an interface, such as a video adapter.

A computer implementing one or more embodiments of the present invention may operate in a networked environment using logical connections to one or more remote computers, such as a remote computer. The remote computer may be another personal computer, a server, a router, a network PC, a peer device or other common network node, and typically includes many or all of the elements described above relative to the personal computer. The logical connections described herein include LAN and wide area networks (WAN). Such networking environments are commonplace in offices, enterprise-wide computer networks, Intranets and the Internet.

When used in a LAN networking environment, the personal computer is connected to the local network through a network interface or adapter. When used in a WAN networking environment, the personal computer typically includes a means for establishing communications over the wide area network, such as the Internet. This means is connected to the system bus via the serial port interface. In a networked environment, program modules depicted relative to the personal computer, or portions thereof, may be stored in the remote memory storage device. It will be appreciated that the network connections shown are exemplary and other means of establishing a communications link between the computers may be used.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with a frame-based, on-demand spectrum contention protocol, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A method of operating a cognitive radio (CR) communication network, comprising:
   operating the CR communication network using synchronized frames and superframes to provide communication services within cells of base stations of the CR communication network;
   using a communication link between the base stations;
   maintaining a schedule of assignments (SchAs) of frames, within a channel, to the base stations, wherein each frame is assigned to at most one base station for exclusive use for the communication services by the base station,
   communicating the SchAs between base stations on the communications link; and
   using a frame contention among a plurality of contending base stations to share use of a single channel by assigning frames to base stations for scheduled sole use for transmission;
   wherein the frame contention comprises making assignments, in the SchA, of individual frames of subsequent superframes of the single channel among the plurality of contending base stations by comparing spectrum contention numbers (SCN) which are randomly chosen from a finite set of numbers in which each number is equally likely; and
   wherein the frame contention further comprises frame acquisition, by which a base station acquires scheduled use of the individual frames of subsequent superframes.

2. The method of claim 1 wherein both frame acquisition and maintaining the SchAs of frames to base stations includes sensing, by a first base station, by means of the communication link, during a sensing time period, for a release message indicating one or more scheduled frames is released by a second base station for scheduling and use by another base station in the plurality of base stations.

3. The method of claim 2 responsive to the second base station not being a one hop neighbor of the first base station, further comprising the first base station treating the one or more frames released as available for scheduling.

4. The method of claim 2 responsive to the second base station being a one hop neighbor of the first base station, further comprising the first base station determining whether the one or more frames released is available for scheduling.

5. The method of claim 1, wherein frame acquisition comprises a base station sending a message, SC_ACK, using the communication link, to other base stations, wherein the SC_ACK conveys information comprising intent to acquire for use frames that are available for use in a subsequent superframe, which frames the base station intends to acquire, and a spectrum contention number (SCN); and wherein the base station senses for responses from other base stations in the sensing time period which follows soonest after the base station sends the SC_ACK.

6. The method of claim 5, wherein responsive to receiving no messages from other base stations, the base station that sent the SC_ACK, schedules to itself the frames listed in the SC_ACK, updates the SchAs, and transmits on the communication link the updated SchAs.

7. The method of claim 5, wherein responsive to receiving, during the sensing time period following transmission of the SC_ACK, a frame release message indicating that a second base station has acquired the scheduled use of one or more of the frames listed in the SC_ACK of the first base station and containing a SCN generated by the second base station, the first station determines if the second base station is a one-hop neighbor.

8. The method of claim 7, wherein responsive to determining that the second base station is not a one-hop neighbor, the first base station calculates a new SCN, and repeats the transmission of the SC_ACK comprising the new SCN and the list of frames sent in the previous SC_ACK.

9. The method of claim 7, wherein responsive to determining that the second base station is a one-hop neighbor, the first base station compares the SCN of its SC_ACK message with the SCN of the frame release message, and responsive to the SCN of the SC_ACK being smaller, the first base station calculates a new SCN, and repeats the transmission of the SC_ACK with the same list of frames and the new SCN, but responsive to the SCN of the SC_ACK being larger, the first base station creates a new list of frames by removing the frames listed in the release message from the list of frames sent in the SC_ACK, calculates a new SCN and transmits a new SC_ACK comprising the new list of frames and the new SCN.

10. The method of claim 5, wherein responsive to receiving, during the sensing time period following transmission of the SC_ACK, another SC_ACK from a second base station, containing a SCN for the second base station and a list of frames that lists one or more of the frames of the SC_ACK of the first base station, the first base station compares the SCN of its SC_ACK with the SCN of the SC_ACK of the second base station.

11. The method of claim 10, wherein if the SCN of the SC_ACK of the first base station is smaller, the first base station calculates a new SCN, and transmits a new SC_ACK comprising the list of frames that was in the prior SC_ACK and the new SCN.

12. The method of claim 10, wherein if the SCN of the SC_ACK of the first base station is larger, the first base station creates a new list of frames by removing the frames common to the SC_ACK of the second base station and the SC_ACK of the first base station from the list of frames of its original SC_ACK, calculates a new SCN, and transmits a SC_ACK with the new list of frames and the new SCN.

13. The method of claim 1, wherein the communication link between base stations operates using discrete sensing time periods and discrete messaging time periods.

14. The method of claim 1, wherein the frame contention assigns frames within a superframe which follows immediately after the superframe in which the frame contention occurs.

15. The method of claim 1, wherein a first base station contends for use of frames only if either another base station contends for the use of frames scheduled for use by the first base station, or if the first base station determines that within its cell there is a need to use more frames than the first station has been assigned.

16. The method of claim 1, wherein the finite set of numbers from which the SCN is chosen is a set of integers $\{0, 1, \ldots 2^x-1\}$, where X is a number of binary bits representing a fixed point integer used by the CR communication network.

17. A system for a cognitive radio communication network, the system comprising:
- a plurality of base station transceivers each serving as a point in a point-to-multipoint architecture, communicating on a communication link between base stations, using synchronized frames and superframes to provide communication services within cells of base stations, wherein there is a beacon window within each frame;
- wherein the system maintains a schedule of assignments (SchAs) of frames within a channel to the base stations, wherein each frame is assigned to at most one base station for exclusive use for communication services by the base station;
- wherein the system communicates the SchA between the base stations on the communications link;
- wherein the system operates a frame contention among a plurality of contending base stations to share use of a single channel by assigning frames for sole transmission use to base stations
- wherein the frame contention comprises making assignments in the SchAs of individual frames of subsequent superframes of the single channel among the plurality of contending base stations by comparing spectrum contention numbers (SCNs) which are randomly chosen from a finite set of integers in which each integer is equally likely; and
- wherein the frame contention further comprises frame acquisition, by which a base station acquires scheduled use of the individual frames in the subsequent superframes.

18. The system of claim 17, wherein a first base station contends for use of frames only if either another base station contends for use of frames already scheduled for use by the first base station, or if the first base station determines that within its cell there is need to use more frames than the first station has been assigned.

19. The system of claim 17, wherein the finite set of numbers from which the SCN is chosen is a set of integers $\{0, 1, \ldots 2^x-1\}$), where X is a number of binary bits representing a fixed point integer used by the CR communication network.

20. The system of claim 17, wherein a SC_ACK sent by a base station for assignment of frames contains the list of frames in subsequent superframes which the base station intends to acquire, and a spectrum control number (SCN).

* * * * *